United States Patent

Asaoka et al.

[11] Patent Number: 5,858,273
[45] Date of Patent: Jan. 12, 1999

[54] LIQUID CRYSTAL DEVICE

[75] Inventors: Masanobu Asaoka, Yokohama; Yasuaki Takeda, Chigasaki; Yukio Hanyu, Isehara; Ikuo Nakazawa, Atsugi; Nobuhiro Ito, Sagamihara; Yasufumi Asao, Isehara; Takashi Moriyama, Atsugi, all of Japan

[73] Assignee: Canon Kabushiki Kaisha, Tokyo, Japan

[21] Appl. No.: 684,864

[22] Filed: Jul. 25, 1996

[30] Foreign Application Priority Data

Jul. 27, 1995 [JP] Japan .................................. 7-210226
Jul. 27, 1995 [JP] Japan .................................. 7-210227

[51] Int. Cl.$^6$ .................. C09K 19/56; C09K 19/52; C09K 19/02; G02F 1/1337
[52] U.S. Cl. ............................... 252/299.4; 252/299.01; 252/299.6; 252/299.61; 252/299.62; 252/299.63; 428/1; 349/123; 349/184
[58] Field of Search ..................... 252/299.01, 299.6, 252/299.62, 299.4, 299.61, 299.63; 428/1

[56] References Cited

U.S. PATENT DOCUMENTS 4,367,924  1/1983  Clark et al. .................................. 359/56
4,879,059  11/1989 Hanyu et al. ........................ 252/299.4

(List continued on next page.)

FOREIGN PATENT DOCUMENTS 56-107216  1/1983   Japan .
02142753   5/1990   Japan .
WO93022396 11/1993  WIPO .

OTHER PUBLICATIONS

M. Schadt & W.Helfrich, Appl. Phys. Lett., v. 18 No. 4, Feb. 15, 1971, pp. 127–128.
Clark & Lagerwall, Japan Display '86, pp. 456–458.
Y. Ouchi et al., Japanese Journal of Appl. Phys., v. 27 No. 5, May 1988, L725–L728.
A.D.L. Chandani et al., Japanese Journal of Applied Physics, v. 27 No. 5, May 1988, L729–L732.
Structures and Properties of Ferroelectric Liquid Crystals (1990) 344–357.
Future Liquid Crystal Display and its Materials (1992) Ch. 3 and 5.
4th Intl. FLC Conf., P–46 (1993) 169–170.

Primary Examiner—C. H. Kelly
Attorney, Agent, or Firm—Fitzpatrick, Cella, Harper & Scinto

[57] ABSTRACT

A liquid crystal device is constituted by a pair of transparent substrates each having thereon a transparent electrode, and a chiral smectic liquid crystal composition disposed between the substrates so as to assume at least two optically stable states. At least one of the substrates is provided with an alignment film which comprises a polyimide represented by a recurring unit of formula (I) shown below and has been subjected to a uniaxial aligning treatment.

Formula (I):

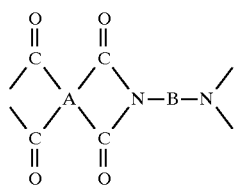

wherein A denotes a planar tetravalent organic residue group comprising an aromatic ring, an aromatic polycyclic ring, a heterocyclic ring or a condensed polycyclic ring, and B denotes a divalent aliphatic group comprising $-(CH_2)_n-$ (n: an integer of at least 1) or an alicyclic ring. The chiral smectic liquid crystal composition may contain at least one species of fluorine-containing mesomorphic compound comprising a fluorocarbon terminal portion and a hydrocarbon terminal portion connected with a central core and having a smectic phase or a latent smectic phase.

8 Claims, 7 Drawing Sheets

U.S. PATENT DOCUMENTS

| | | | |
|---|---|---|---|
| 5,082,587 | 1/1992 | Janulis et al. | 252/299.01 |
| 5,129,727 | 7/1992 | Hanyu et al. | 359/75 |
| 5,262,082 | 11/1993 | Janulis et al. | 252/299.01 |
| 5,285,304 | 2/1994 | Hotta et al. | 359/81 |
| 5,320,883 | 6/1994 | Asaoka et al. | 428/1 |
| 5,364,668 | 11/1994 | Takimoto et al. | 428/1 |
| 5,399,291 | 3/1995 | Janulis et al. | 252/299.1 |
| 5,417,883 | 5/1995 | Epstein et al. | 252/299.01 |
| 5,437,812 | 8/1995 | Janulis et al. | 252/299.01 |
| 5,443,864 | 8/1995 | Takimoto et al. | 428/1 |
| 5,464,668 | 11/1995 | Asaoka et al. | 428/1 |
| 5,482,650 | 1/1996 | Janulis et al. | 252/299.01 |
| 5,497,257 | 3/1996 | Hotta et al. | 359/81 |
| 5,510,159 | 4/1996 | Asaoka et al. | 428/1 |
| 5,545,444 | 8/1996 | Nakayama et al. | 428/1 |
| 5,578,241 | 11/1996 | Plach et al. | 252/299.01 |
| 5,612,450 | 3/1997 | Mizushima et al. | 528/353 |
| 5,657,141 | 8/1997 | Terada et al. | 349/184 |
| 5,658,491 | 8/1997 | Kistner et al. | 252/299.01 |
| 5,686,019 | 11/1997 | Nakamura | 252/299.01 |

FIG. 6AA
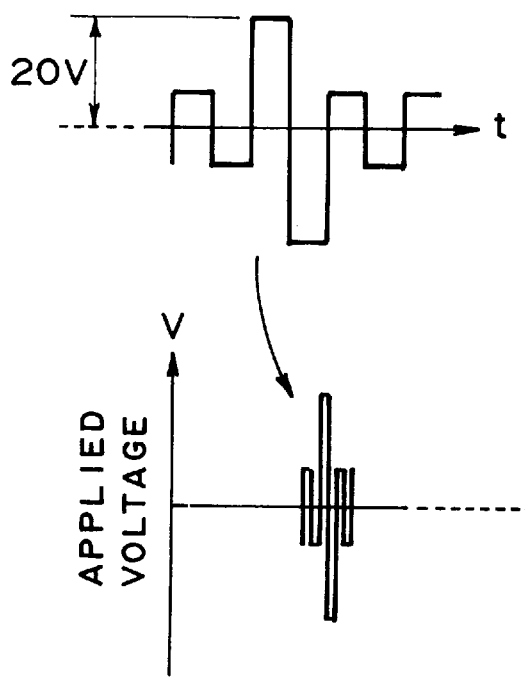
FIG. 6AB
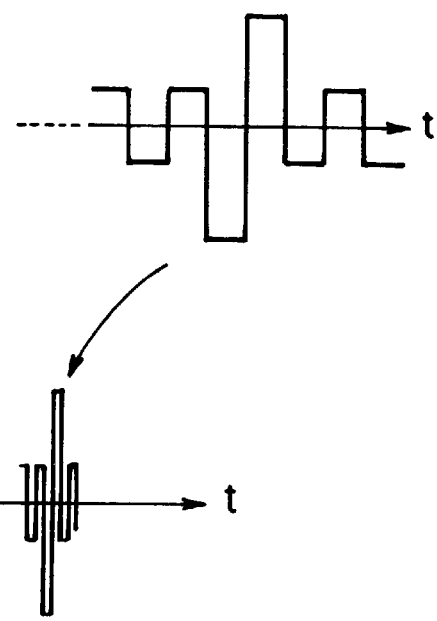
FIG. 6A
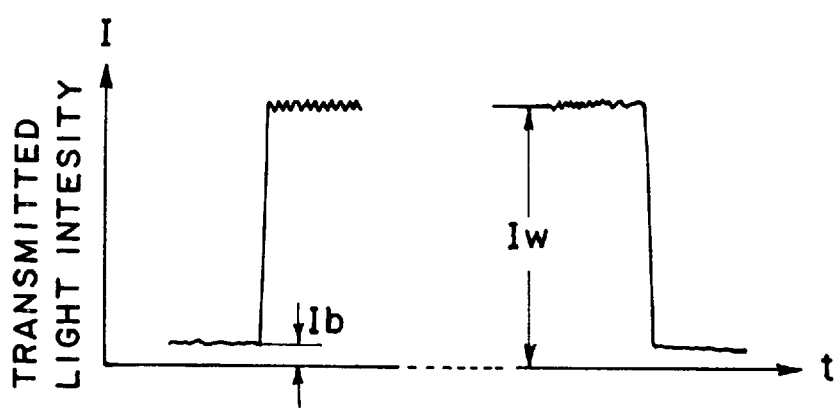
FIG. 6B

LIQUID CRYSTAL DEVICE

FIELD OF THE INVENTION AND RELATED ART

The present invention relates to a liquid crystal device using a chiral smectic liquid crystal composition for use in computer terminal displays, various flat panel displays for word processors, type writers and television receivers, video camera view finders, light valves for projectors, light valves for liquid crystal printers, etc.

The most popular and extensively used display may be CRTs (cathode ray tubes) which have been widely used for displaying motion pictures of television and video tape recorders or as monitor displays for personal computers. Based on the operation characteristic, the CRT is accompanied with difficulties such that the recognizability of a static image is lowered due to flickering and scanning fringes caused by an insufficient resolution, and the fluorescent member is deteriorated due to burning. Further, it has been recently found that electromagnetic wave emitted from CRTs can adversely affect human bodies and health of VDT operators. Further, the CRT structurally has a large rearward space behind the display surface, so that the space economization in offices and at home may be obstructed thereby.

As a type of device solving such problems of the CRT, there has been known a liquid crystal device, including a type using a twisted nematic (TN) liquid crystal as disclosed by M. Schadt and W. Helfrich, "Applied Physics Letters", Vol. 18, No. 4 (Feb. 17, 1971), pp. 127–128.

The liquid crystal device using a TN-liquid crystal includes a simple matrix-type liquid crystal device which is advantageous from a viewpoint of production cost. This type of liquid crystal device is however accompanied with a problem that it is liable to cause crosstalk when driven in a multiplex manner by using an electrode matrix of a high pixel density, and therefore the number of pixels is retracted.

In contrast with such a simple matrix-type liquid crystal device, a TFT-type liquid crystal device has been developed in recent years, wherein each pixel is provided with and driven with a TFT (thin film transistor). As a result, the problems of crosstalk and response speed can be solved but, on the other hand, a larger area device of the type poses an extreme difficulty in industrial production thereof without inferior pixels. Further, even if such production is possible, the production cost can be increased enormously.

For providing improvements to the above-mentioned difficulties of the conventional types of liquid crystal devices, a liquid crystal device of the type which controls transmission of light in combination with a polarizing device by utilizing a refractive index anisotropy of chiral smectic liquid crystal molecules, has been proposed by Clark and Lagerwall (Japanese Laid-Open Patent Application (JP-A) 56-107216, U.S. Pat. No. 4,367,924). The chiral smectic liquid crystal generally has chiral smectic C phase (SmC*) or H phase (SmH*) in a specific temperature range and, in the phase, shows a property of assuming either one of a first optically stable state and a second optically stable state in response to an electric field applied thereto and maintaining such a state in the absence of an electric field, namely bistability, and also have a very quick response speed because it causes inversion switching based on its spontaneous polarization. Thus, the chiral smectic liquid crystal develops bistable states showing a memory characteristic and further has an excellent viewing angle characteristic. Accordingly, the chiral smectic liquid crystal is considered to be suitable for constituting a display device or a light valve of a high speed, a high resolution and a large area. Further, an anti-ferroelectric liquid crystal device using a chiral smectic liquid crystal showing three stable states has been proposed recently by Chandani, Takezoe, et al (Japanese Journal of Applied Physics, Vol. 27 (1988), page L729-).

Such a chiral smectic liquid crystal is accompanied with problems, such as the occurrence of zigzag-shaped alignment defects and twisting of liquid crystal molecules between a pair of substrates (called "splay alignment") leading to a lowering in contrast (as described in, e.g., "Structure and Physical Properties of Ferroelectric Liquid Crystal" (in Japanese) authored by Atsuo Fukuda and Hideo Takezoe; Corona Sha K.K., (1990)). The defects are considered to be attributable to a layer structure of a chiral smectic liquid crystal including two types of chevron structures between a pair of substrates.

A known method of solving the above problem is to provide the liquid crystal molecules with a pretilt angle, thereby uniformizing the chevron layer structure in one direction so that the twisting state (splay alignment state) of liquid crystal molecules between the pair of substrate is made more unstable than a uniform alignment state in respect of elastic energy.

Another method is to form a liquid crystal layer structure not of the bent chevron structure but of a bookshelf structure wherein smectic layers are little inclined but aligned generally in parallel or a structure close thereto, thereby removing the zigzag defects and realizing the uniform alignment to provide a high contrast (as disclosed in, e.g., "Next Generation Liquid Crystal Display and Liquid Crystal Materials" (in Japanese), edited by Atsuo Fukuda; K.K. C.M.C., (1992)). In a method of realizing a bookshelf layer structure, a naphthalene-type liquid crystal material is used. In this case, however, the resultant tilt angle is on the order of 10 deg. and is much smaller than 22.5 deg. which theoretically provides a maximum transmittance, so that the device can exhibit only a low transmittance. Another method is to apply an external electric field to a liquid crystal device containing a liquid crystal in a chevron structure to induce a bookshelf structure, but the resultant structure is rather unstable against an external stimulation, such as a temperature fluctuation.

As a liquid crystal material providing a bookshelf structure or a structure close thereto, a mesomorphic compound having a perfluoroalkyl ether terminal chain (U.S. Pat. No. 5,262,082), a liquid crystal composition containing such a mesomorphic compound (Marc D. Raddiffe et al., 1993 Fourth Ferroelectric Liquid Crystal Interference Meeting, p-46), etc., have been proposed. By using such a liquid crystal material, it is possible to provide a bookshelf structure or a similar structure having a small layer inclination angle with an optimum tilt angle without using an external field, such as an electric field.

However, such a liquid crystal material does not generally assume cholesteric phase. As a result, when a liquid crystal device is formed by disposing such a liquid crystal material between a pair of substrates at least one of which has thereon an alignment control layer subjected to a prescribed uniaxial aligning treatment, the liquid crystal alignment state cannot be sufficiently controlled, thus being liable to fail in providing a good alignment state.

SUMMARY OF THE INVENTION

In view of the above-mentioned circumstances, a principal object of the present invention is to provide a liquid crystal device, particularly a chiral smectic liquid crystal device, containing a stable liquid crystal layer having a bookshelf structure or a structure close thereto having a small layer inclination and assuming a stable alignment state, thereby to exhibit excellent performances, inclusive of a high contrast, a quick response speed, a high resolution and a high brightness.

Another object of the present invention is to provide a display apparatus including such a liquid crystal device showing excellent display characteristics including a high contrast, a high resolution and a high brightness, and having a large display area.

According to the present invention, there is provided a liquid crystal device, comprising: a pair of transparent substrates each having thereon a transparent electrode, and a chiral smectic liquid crystal composition disposed between the substrates so as to assume at least two optically stable states, wherein at least one of the substrates is provided with an alignment film which comprises a polyimide represented by a recurring unit of formula (I) shown below and has been subjected to a uniaxial aligning treatment, and said chiral smectic liquid crystal composition has a layer spacing-changing characteristic providing a layer spacing $d_A$ at a first transition point where the layer spacing of the liquid crystal composition begins to decrease at a discontinuously larger decrease rate on temperature decrease in vicinity of a transition temperature from smectic A phase to chiral smectic C phase and a layer spacing $d_{min}$ at a second transition point where the layer spacing of the liquid crystal composition begins to increase on further temperature decrease from the first transition point, wherein $0.990 \leq d_{min}/d_A$, Formula (I):

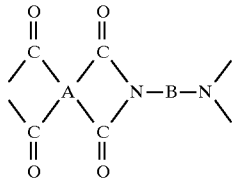

wherein A denotes a planar tetravalent organic residue group comprising an aromatic ring, an aromatic polycyclic ring, a heterocyclic ring or a condensed polycyclic ring, and B denotes a divalent aliphatic group comprising $-(CH_2)_n-$ (n: an integer of at least 1) or an alicyclic ring.

The chiral smectic liquid crystal composition may preferably contain at least one species of fluorine-containing mesomorphic compound comprising a fluorocarbon terminal portion and a hydrocarbon terminal portion connected with a central core and having a smectic phase or a latent smectic phase.

In another preferred embodiment, the above-mentioned pair of substrates includes one having an alignment film comprising the above-mentioned polyimide represented by the recurring unit of the formula (I) and subjected to a uniaxial aligning treatment, and the other having an alignment film not subjected to a uniaxial aligning treatment.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 6A is a waveform diagram showing two types of applied voltage waveform used in Examples appearing hereinafter; FIG. 6B is an illustration of resultant transmitted light intensities through the device; and FIGS. 6AA and 6AB are enlarged illustrations of the two types of applied voltage waveforms shown in FIG. 6A.

DETAILED DESCRIPTION OF THE INVENTION

Figure 1:
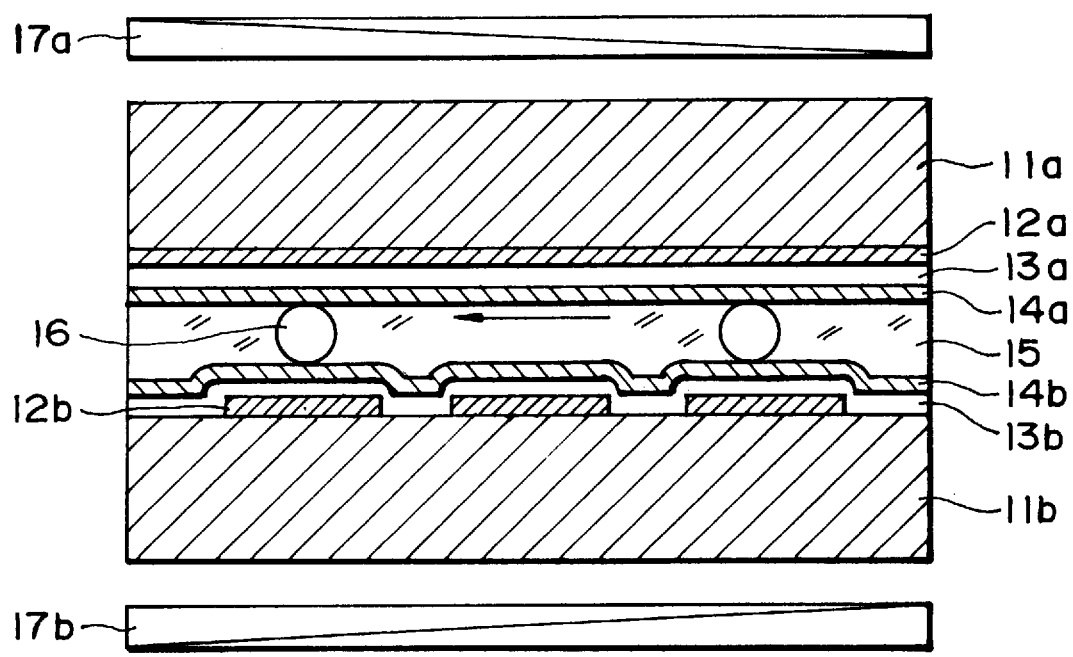
FIG. 1 is a schematic sectional view of an embodiment of the liquid crystal device using a chiral smectic liquid crystal according to the present invention.
Figures 2A, 2B, 2C, 2D:
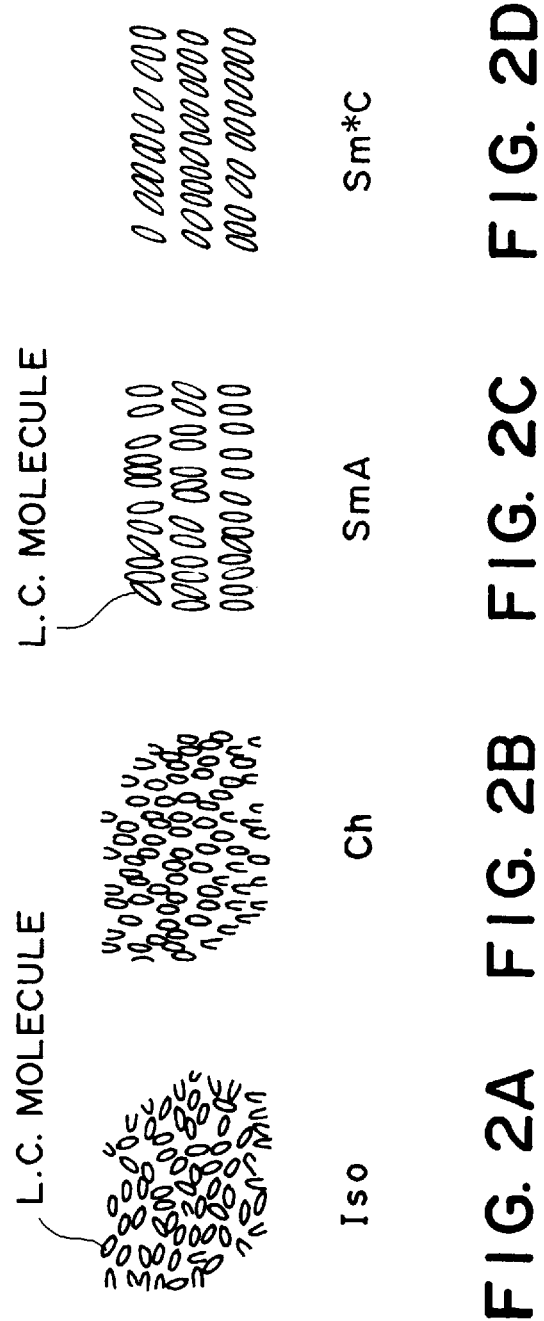
FIGS. 2A–2D are schematic illustrations of liquid crystal molecular alignment states in respective liquid crystal phases.
Figures 3A, 3B, 3C, 3D:
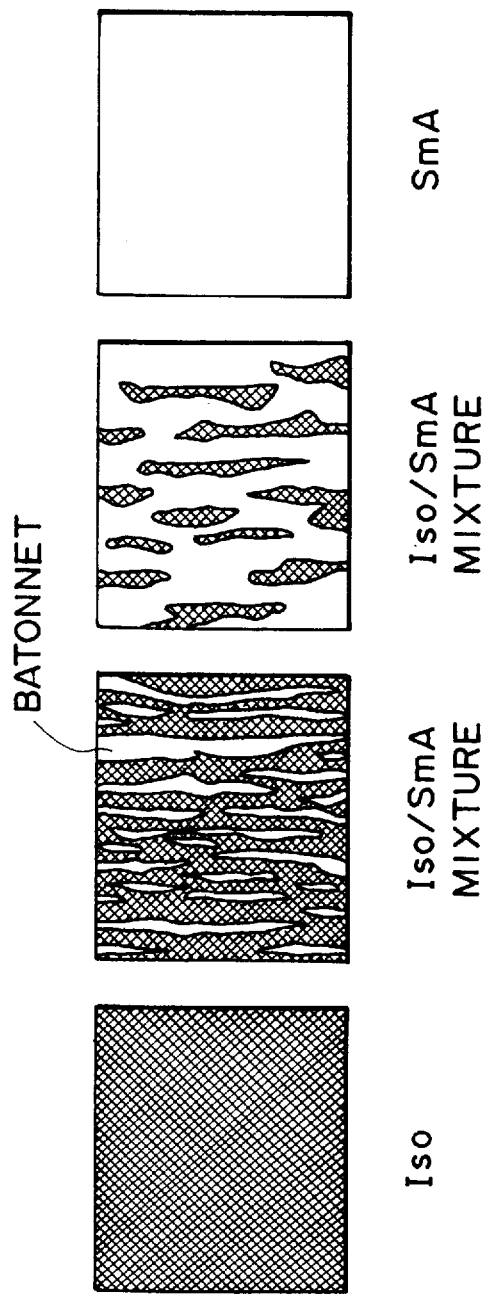
FIGS. 3A–3D are schematic illustrations of states of phase transition of Iso (isotropic) phase to SmA (smectic A) phase of a liquid crystal material lacking Ch (cholesteric) phase.

A chiral smectic liquid crystal disposed between a pair of oppositely disposed substrates may develop bistability in its Sm* phase (chiral smectic phase, typically SmC* (chiral smectic C) phase), which is formed by gradual cooling from its liquid phase (isotropic phase). Accordingly, the alignment state in chiral smectic phase is greatly affected by a phase transition series between the isotropic phase and the chiral smectic phase. In view of the thermodynamic stability, the phase transition series may include the following four types:

(1) Iso—Ch(N*)—SmA—SmC*,
(2) Iso—SmA—SmC*,
(3) Iso—Ch(N*)—SmC*, and
(4) Iso—SmC*, wherein Iso denotes isotropic phase; Ch(N*), cholesteric (i.e., chiral nematic) phase; and SmA, smectic A phase. The liquid crystal alignment states in the respective phases are schematically illustrated in FIGS. 2A–2D. In the case of a liquid crystal material having the phase transition series (1), a liquid crystal molecule long axis order is determined at Iso-Ch transition, a liquid crystal molecule positional order (layer structure) is determined at Ch-SmA transition, and a liquid crystal molecule tilt is developed at SmA-SmC transition, so that a uniform alignment can be easily obtained because of such a sequential order determination. In contrast thereto, in the cases of liquid crystal having the phase transition series (2), (3) and (4), it becomes difficult to realize a uniform alignment because plural orders have to be determined simultaneously, i.e., simultaneous determination of molecular long axis order and layer structure for (2); simultaneous determination of layer structure and tilting of liquid crystal molecules for (3); and simultaneous determination of molecular long-axis order, layer structure and tilting for (4). The present invention aims at realization of uniform alignment of a liquid crystal material (composition) having the phase transition series (2) which is suitable for providing a bookshelf structure or a structure close thereto.

FIGS. 3A–3D are sketches of polarizing microscopic observation by us of stages of Iso-SmA phase transition. According to our observation during the transition from isotropic (Iso) phase to smectic A (SmA) phase, islands of SmA (hereinafter called "batonnets") having an almost spheroidal shape are first generated and are joined together to complete the phase transition. Further, it is also observed that alignment defects occur in a liquid crystal (particularly in a liquid crystal cell) when the batonnets grow in random directions or due to joint failure between batonnets.

The mechanism for occurrence of such alignment defects has not been fully clarified as yet, but it has been found possible to provide a defect-free, uniform and good alignment structure by disposing a liquid crystal composition having the above-mentioned phase transition series (2) and liable to cause alignment defects as described above between a pair of substrates, at least one of which is provided with an alignment film comprising a polyimide having a recurring unit of the above-mentioned formula (I) and subjected to a uniaxial aligning treatment, such as rubbing. This may be attributable to factors such that the polyimide having the recurring unit of the formula (I) can be readily stretched during a uniaxial aligning treatment and causes a large electron density anisotropy in the layer after the aligning treatment to exert a strong alignment control force to the liquid crystal having the above-mentioned phase transition series (2).

Hereinbelow, a cell structure of a preferred embodiment of the liquid crystal device according to the present invention according to the present invention will be described with reference to FIG. 1.

Referring to FIG. 1, the liquid crystal device includes a pair of glass substrates 11a and 11b having thereon transparent electrodes 12a and 12b, respectively, of tin oxide, indium oxide, indium tin oxide (ITO), etc., and further insulating films 13a and 13b, respectively, functioning as a short circuit prevention layer of ZnO, ZrO, $TaO_x$, etc. The substrate 11a is further provided with an alignment film (alignment control layer) 14a of a polyimide subjected to a uniaxial aligning treatment, such as rubbing. The substrate 11b is provided with an alignment film 14b of silane coupling agent, polyimide, polysiloxane, etc., not subjected to a uniaxial aligning treatment. The substrates 11a and 11b are disposed opposite to each other with spacer beads 16 of, e.g., silica or alumina and sealed at periphery thereof with a sealant (not shown) to leave a space therebetween, which is filled with a chiral liquid crystal composition 15 according to the present invention as described above. The thus-formed cell structure is sandwiched between a pair of polarizers 17a and 17b to form a liquid crystal device. FIG. 1 shows an embodiment of an asymmetrical cell structure, but the alignment film of the present invention can also be used to provide a symmetrical cell structure.

In the liquid crystal device of the above-described structure, the transparent electrodes 12a and 12b may be connected to a signal power supply (not shown) so as to effect switching depending on switching signals from the signal power supply. The liquid crystal device may function as a light valve of a display device, etc. Further, if transparent electrodes 12a and 12b are provided respectively in pluralities so as to form a cross matrix electrode structure, a pattern display or exposure becomes possible to provide displays for a personal computer, a wordprocessor, etc., or a light valve for a printer, etc.

In the liquid crystal device of the above-mentioned structure, the alignment control layer 14a may comprise a uniaxially aligning-treated film. preferably a rubbed film, of a polyimide which has been formed by application of a polyamic acid and baking thereof, because of easy preparation and hiah alignment control power.

Specific examples of the polyimide having the recurring unit of the general formula (I) may include polyimides P-1 to P-17 as represented by recurring units shown below:

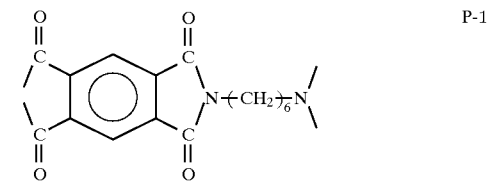
P-1

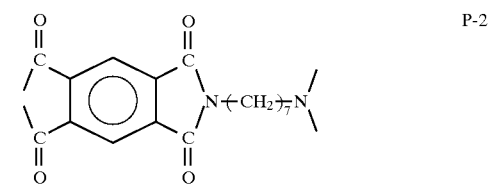
P-2

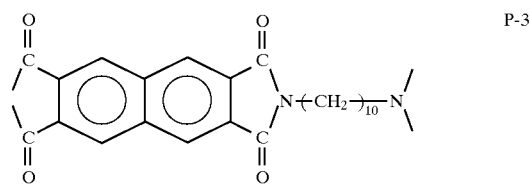
P-3

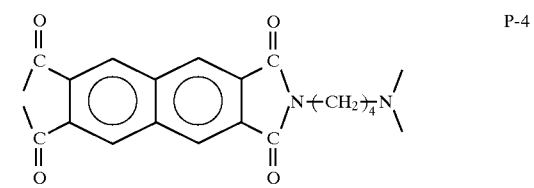
P-4

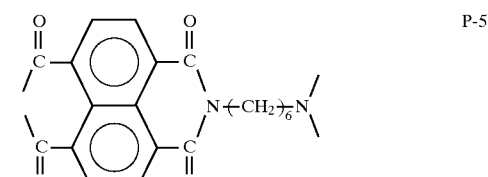
P-5

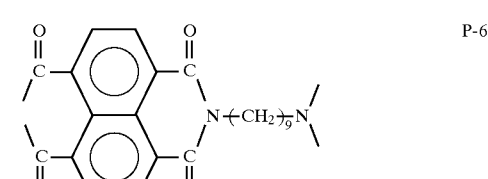
P-6

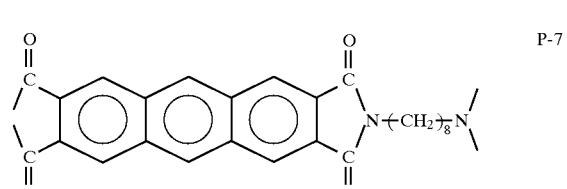
P-7

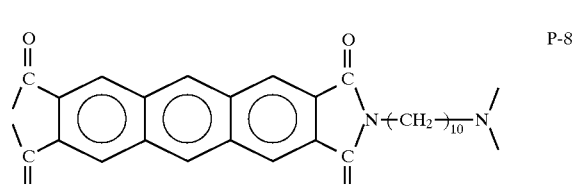
P-8

-continued

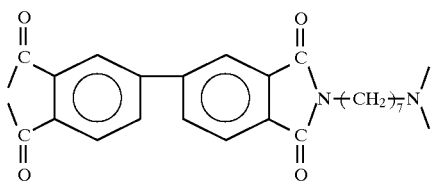
P-16

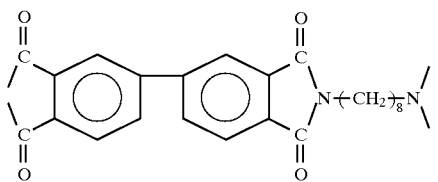
P-10

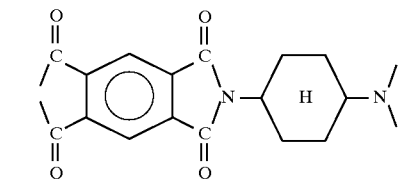
P-11

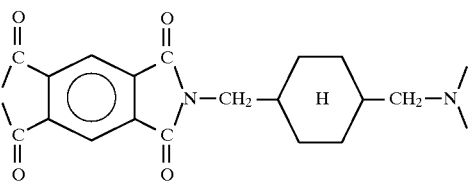
P-12

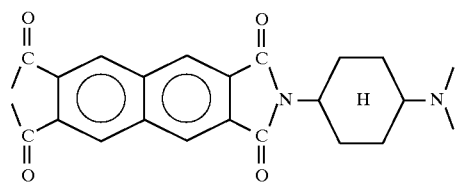
P-13

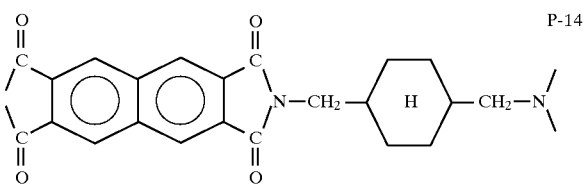
P-14

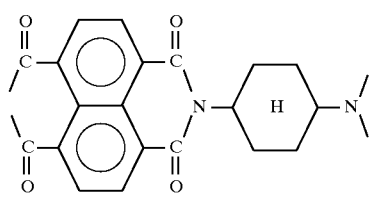
P-15

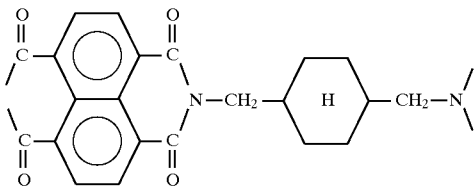
P-16

-continued

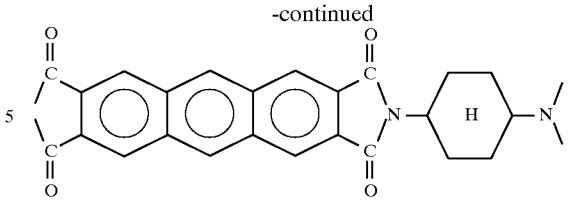
P-17

In order to exhibit a strong alignment control force on a chiral smectic liquid crystal composition, the polyimide may preferably have high rigidity, linearity and crystallinity. In view of these properties, and further good solubility in a solvent and applicability onto a substrate, polyimides having condensed polycyclic hydrocarbon group A specifically represented by the following skeletons are particularly preferred:

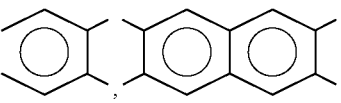

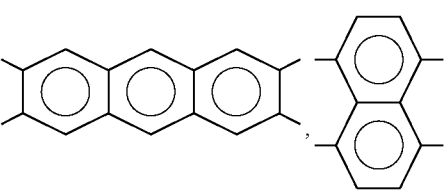

It is further preferred to use a polyimide having a recurring unit of the formula (I) wherein B represents a polymethylene group of $-(CH_2)_n-$, wherein n is an even number of 2–10 so as to attain a good alignment characteristic.

The chiral smectic liquid crystal composition may desirably contain a fluorine-containing mesomorphic compound which preferably has a structure including a fluorocarbon terminal portion and a hydrocarbon terminal portion connected by a central core and has smectic phase or latent smectic phase. The term "latent smectic phase" refers to a property of a compound concerned that the compound alone does not exhibit smectic phase but can be a component compatibly contained in smectic phase of a liquid crystal composition.

In a preferred class of the fluorine-containing mesomorphic compound, the fluorocarbon terminal portion may preferably be:

a group represented by the formula $-D^1-C_{xa}F_{2xa}-X$, where xa is 1–20; X is $-H$ or $-F$; $-D^1-$ is $-CO-O-(CH_2)_{ra}-$, $-O-(CH_2)_{ra}-$, $-(CH_2)_{ra}-$, $-O-SO_2-$, $-SO_2-$, $-SO_2-(CH_2)_{ra}-$, $-O-(CH_2)_{ra}-O-(CH_2)_{rb}-$, $-(CH_2)_{ra}-N(C_{pa}H_{2pa+1})-SO_2-$ or $-(CH_2)_{ra}-N(C_{pa}H_{2pa+1})-CO-$; where ra and rb are independently 1–20; and pa is 0–4; or a group represented by $-D^2-(C_{xb}F_{2xb}-O)_{za}-C_{ya}F_{2ya+1}$, wherein xb is 1–10 independently for each $(C_{xb}F_{2xb}-O)$; ya is 1–10; za is 1–10; $-D^2-$ is $-CO-O-C_{rc}H_{2rc}-$, $-O-C_{rc}H_{2rc}-$, $-C_{rc}H_{2rc}-$, $-O-(C_{sa}H_{2sa}-O)_{ta}-C_{rd}H_{2rd}-$, $-O-SO_2-$, $-SO_2-$, $-SO_2-C_{rc}H_{2rc}-$, $-C_{rc}H_{2rc}-N(C_{pb}H_{2pb+1})-SO_2-$, $-C_{rc}H_{2rc}-N(C_{pb}H_{2pb+1})-CO-$, or a covalent bond, where rc and rd are independently 1–20; sa is independently 1–10 for each $(C_{sa}H_{2sa}-O)$; ta is 1–6; and pb is 0–4.

In the case of a mesomorphic compound having a perfluoroalkyl-type terminal portion, the mesomorphic compound may preferably have a central core comprising at least two aromatic, heteroaromatic, cycloaliphatic, or substituted aromatic, heteroaromatic, or cycloaliphatic rings. The aromatic or heteroaromatic ring may be selected from fused aromatic, heteroaromatic, or non-fused aromatic or heteroaromatic rings, and the rings may be connected one with another by means of functional groups selected from —COO—, —COS—, —HC=N—, —COSe—. Heteroatoms within the heteroaromatic ring comprise at least one atom selected from N, O or S.

In the case of a mesomorphic compound having a perfluoroalkyl ether-type terminal portion, the mesomorphic compound may preferably have a central core comprising at least two rings independently selected from aromatic, heteroaromatic, cycloaliphatic, or substituted aromatic, heteroaromatic, or cycloaliphatic rings, connected one with another by a covalent bond or by groups selected from —COO—, —COS—, —HC=N—, —COSe—. Rings may be fused or non-fused. Heteroatoms within the heteroaromatic ring comprise at least one atom selected from N, O or S. Non-adjacent methylene groups in cycloaliphatic rings may be substituted by O or S atoms.

It is particularly preferred to use a fluorine-containing mesomorphic compound of the following general formula (II) or general formula (III):

Formula (II):

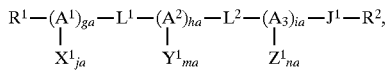

wherein $A^1$, $A^2$ and $A^3$ are each independently

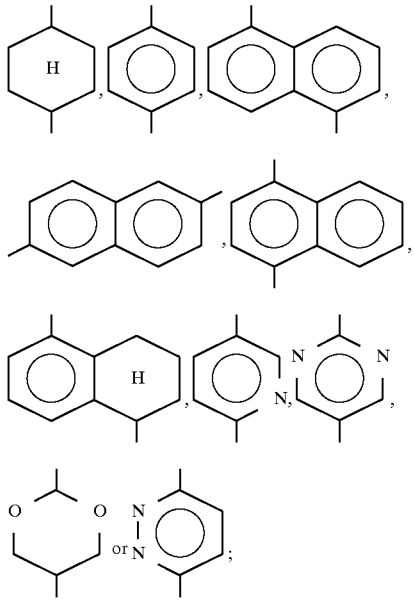

ga, ha and ia are each independently an integer of 0–3 with the proviso that the sum of ga+ha+ia be at least 2;

$L^1$ and $L^2$ are each independently a covalent bond, —CO—O—, —O—CO—, —COS—, —S—CO—, —CO—Se—, —Se—CO—, —CO—Te—, —Te—CO—, —CH$_2$CH$_2$—, —CH=CH—, —C≡C—, —CH=N—, —N=CH—, —CH$_2$—O—, —O—CH$_2$—, —CO— or —O—;

$X^1$, $Y^1$ and $Z^1$ are each a substituent of $A^1$, $A^2$ and $A^3$, respectively, and each $X^1$, $Y^1$ and $Z^1$ are independently —H, —Cl, —F, —Br, —I, —OH, —OCH$_3$, —CH$_3$, —CN or —NO$_2$;

each ja, ma and na are independently an integer of 0–4;

$J^1$ is —CO—O—(CH$_2$)$_{ra}$—, —O—(CH$_2$)$_{ra}$—, —(CH$_2$)$_{ra}$—O—SO$_2$—, —SO$_2$—, —SO$_2$—(CH$_2$)$_{ra}$—, —O—(CH$_2$)$_{ra}$—O—(CH$_2$)$_{rb}$—, —(CH$_2$)$_{ra}$—N(C$_{pa}$H$_{2pa+1}$)—SO$_2$— or —(CH$_2$)$_{ra}$—N(C$_{pa}$H$_{2pa+1}$)—CO—; where ra and rb are independently 1–20, and pa is 0–4;

$R^1$ is —O—C$_{qa}$H$_{2qa}$—O—C$_{qb}$H$_{2qb+1}$, —C$_{qa}$H$_{2qa}$—O—C$_{qb}$H$_{2qb+1}$, —C$_{qa}$H$_{2qa}$—R$^3$, —O—C$_{qa}$H$_{21qa}$—R$^3$, —CO—O—C$_{qa}$H$_{2qa}$—R$^3$, or —O—CO—C$_{qa}$H$_{2qa}$—R$^3$ which may be either straight chain or branched; where $R^3$ is —O—CO—C$_{qb}$H$_{2qb+1}$, —CO—O—C$_{qb}$H$_{2qb+1}$, —H, —Cl, —F, —CF$_3$, —NO$_2$ or —CN; and qa and qb are independently 1–20;

$R^2$ is $C_{xa}F_{2xa}$—X, where X is —H or —F, xa is an integer of 1–20.

Formula (III):

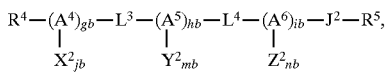

wherein $A^4$, $A^5$ and $A^6$ are each independently

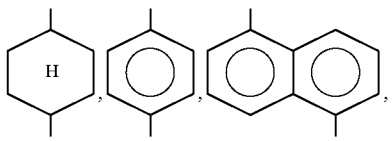

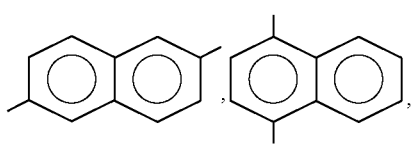

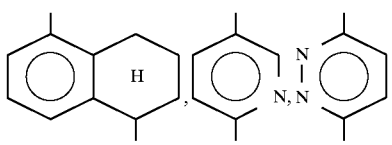

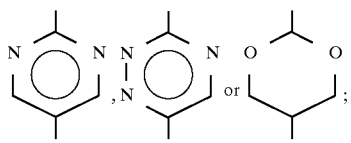

gb, hb, and ib are each independently an integer of 0–3 with the proviso that the sum of gb+hb+ib be at least 2;

each $L^3$ and $L^4$ are independently a covalent bond, —CO—O—, —O—CO—, —CO—S—, —S—CO—, —CO—Se—, —Se—CO—, —CO—Te—, —Te—CO—, —(CH$_2$CH$_2$)$_{ka}$—(ka is 1–4), —CH=CH—, —C≡C—, —CH=N—, —N=CH—, —CH$_2$—O—, —O—CH$_2$—, —CO— or —O—;

$X^2$, $Y^2$ and $Z^2$ are each a substituent of $A^4$, $A^5$ and $A^6$, respectively, and each $X_2$, $Y_2$ and $Z_2$ are independently —H, —Cl, —F, —Br, —I, —OH, —OCH$_3$, —CH$_3$, —CF$_3$, —O—CF$_3$, —CN or —NO$_2$; each jb, mb and nb are independently an integer of 0–4;

$J^2$ is —CO—O—C$_{rc}$H$_{2rc}$—, —O—C$_{rc}$H$_{2rc}$—, —C$_{rc}$H$_{2rc}$—, —O—(C$_{sa}$H$_{2sa}$—O)$_{ta}$—C$_{rd}$H$_{2rd}$—, —O—SO$_2$—, —SO$_2$—, —SO$_2$—C$_{rc}$H$_{2rc}$—,

—$C_{rc}H_{2rc}$—$N(C_{pb}H_{2pb+1})$—$SO_2$— or —$C_{rc}H_{2rc}$—N($C_{pb}H_{2pb+1}$)—CO—; rc and rd are independently 1–20; sa is independently 1–10 for each ($C_{sa}H_{2sa}$—O), ta is 1–6; pb is 0–4;

$R^4$ is —O—($C_{qc}H_{2qc}$—O)$_{wa}$—$C_{qb}H_{2qb+1}$, —($C_{qc}H_{2qc}$—O)$_{wa}$—$C_{qd}H_{2qd+1}$, —$C_{qc}H_{2qc}$—$R^6$, —O—$C_{qc}H_{2qc}$—$R^6$, —CO—O—$C_{qc}H_{2qc}$—$R^6$, or O—CO—$C_{qc}H_{2qc}$—$R^6$ which may be either straight chain or branched; $R^6$ is —O—CO—$C_{qd}H_{2qd+1}$; —CO—O—$C_{qd}H_{2qd+1}$, —Cl, —F, —$CF_3$, —$NO_2$, —CN or —H; qc and qd are independently an integer of 1–20; wa is an integer of 1–10;

$R^5$ is ($C_{xb}F_{2xb}$—O)$_{za}$—$C_{ya}F_{2ya+1}$, wherein xb is independently 1–10 for each ($C_{xb}F_{2xb}$—O); ya is 1–10; and za is 1–10.

The compounds represented by the general formula (II) may be obtained through a process described in U.S. Pat. No. 5,082,587 (corr. to JP-A 2-142753). Specific examples thereof are enumerated below.

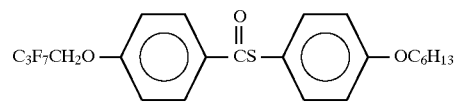

II-1

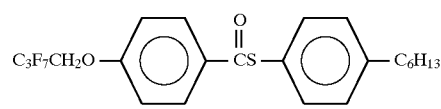

II-2

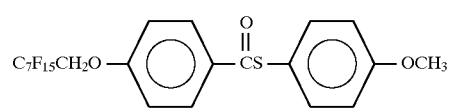

II-3

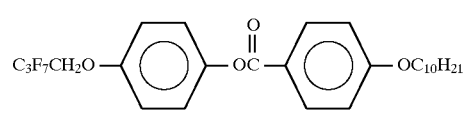

II-4

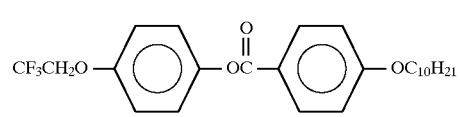

II-5

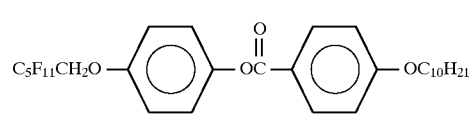

II-6

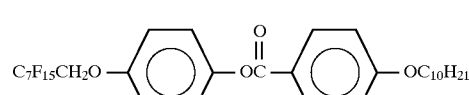

II-7

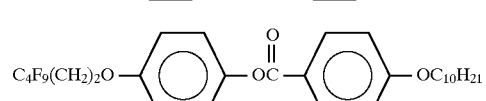

II-8

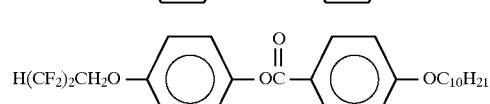

II-9

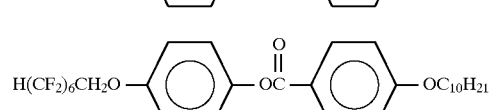

II-10

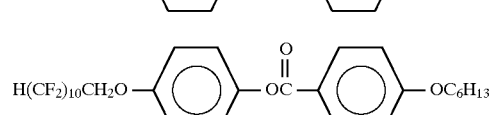

II-11

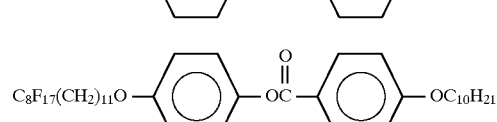

II-12

-continued
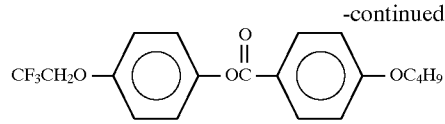
II-13
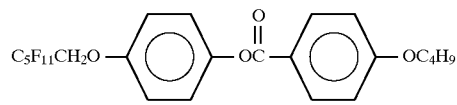
II-14
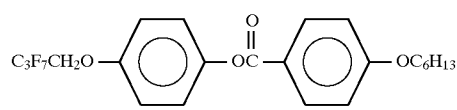
II-15
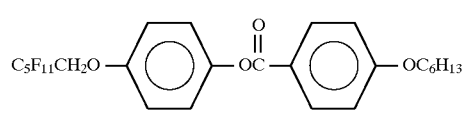
II-16
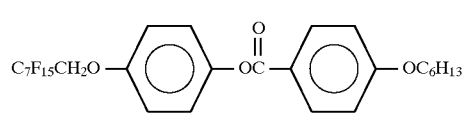
II-17
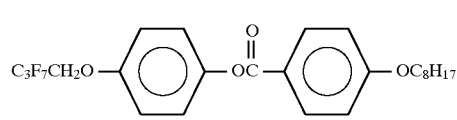
II-18
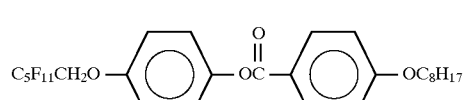
II-19
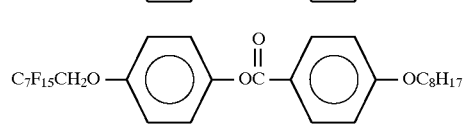
II-20
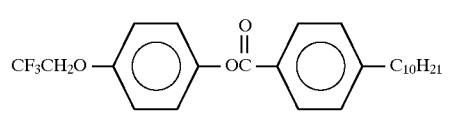
II-21
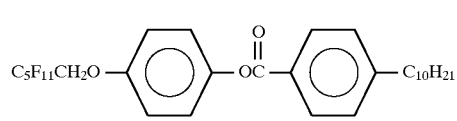
II-22
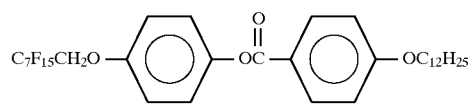
II-23
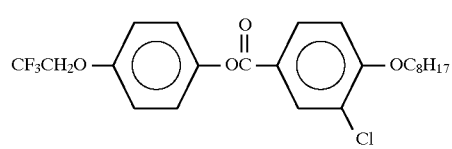
II-24
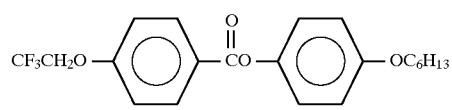
II-25
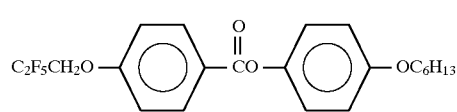
II-26

-continued
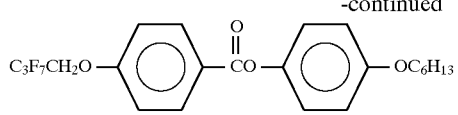 II-27
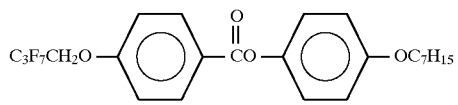 II-28
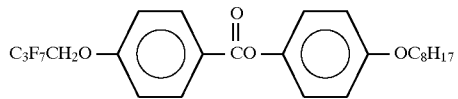 II-29
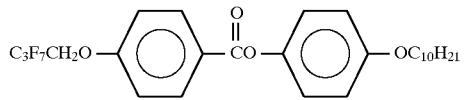 II-30
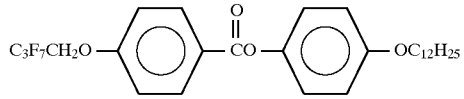 II-31
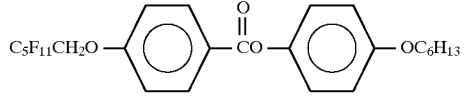 II-32
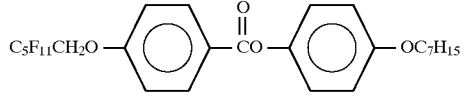 II-33
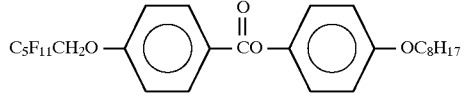 II-34
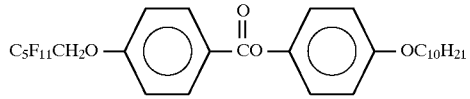 II-35
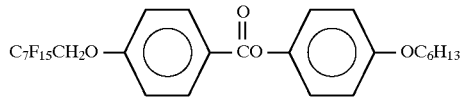 II-36
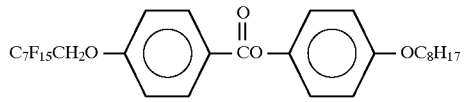 II-37
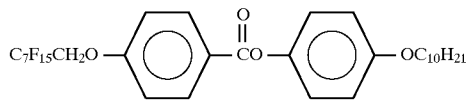 II-38
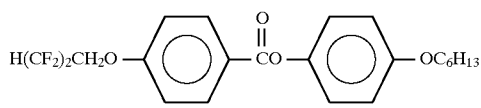 II-39
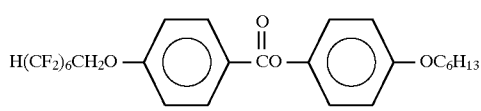 II-40

-continued
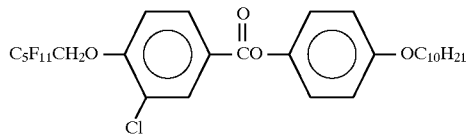
II-41
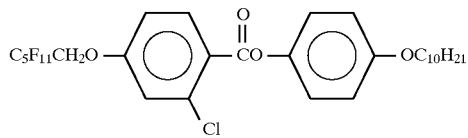
II-42
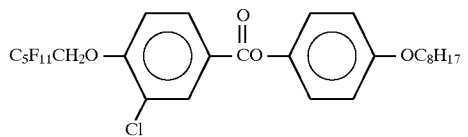
II-43
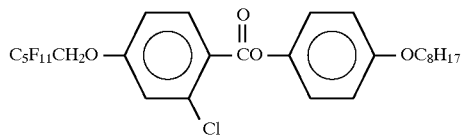
II-44
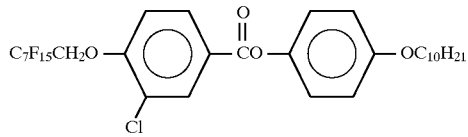
II-45
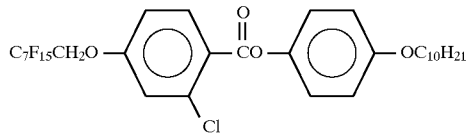
II-46
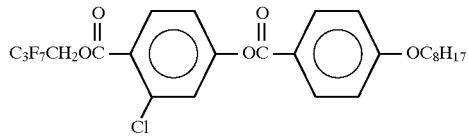
II-47
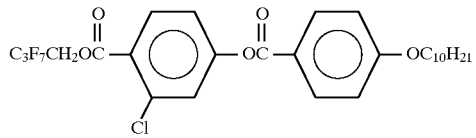
II-48
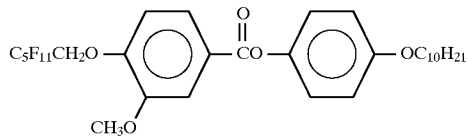
II-49
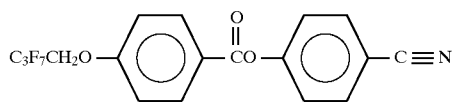
II-50
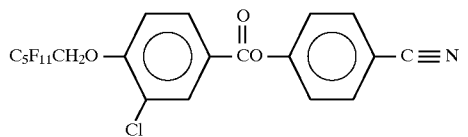
II-51
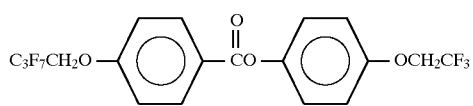
II-52

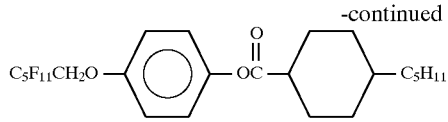
II-53
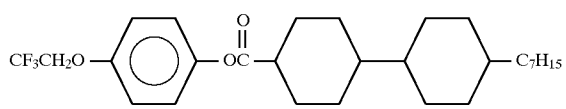
II-54
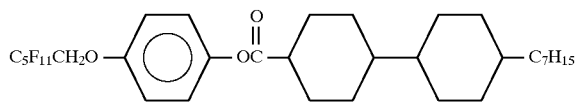
II-55
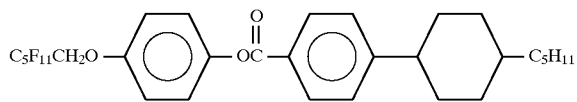
II-56
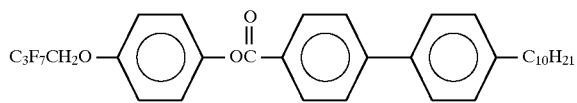
II-57
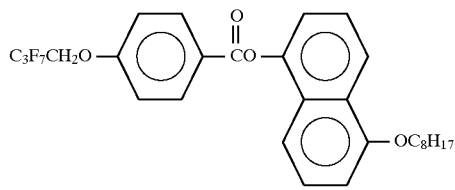
II-58
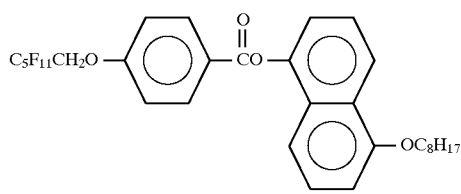
II-59
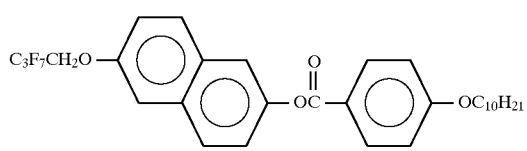
II-60
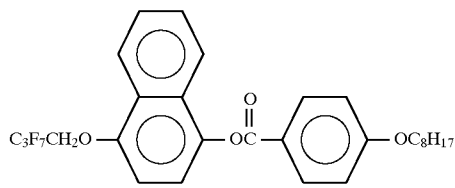
II-61
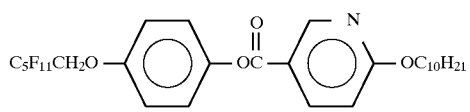
II-62
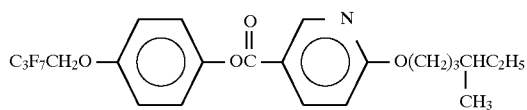
II-63
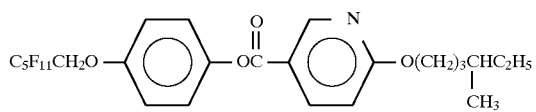
II-64

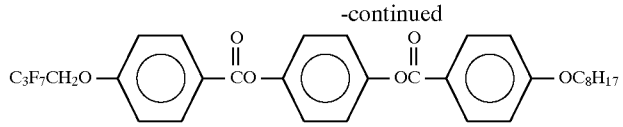
II-65
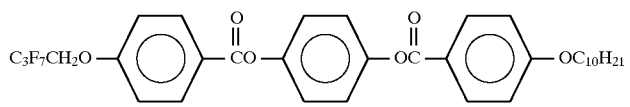
II-66
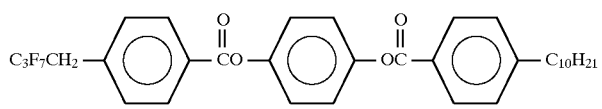
II-67
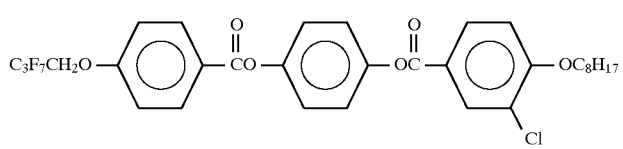
II-68
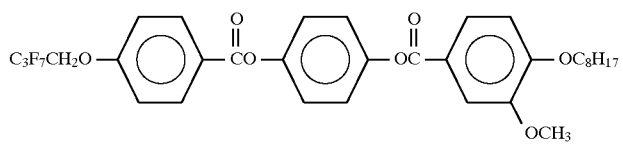
II-69
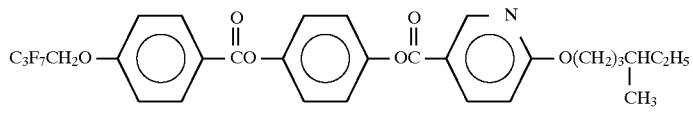
II-70
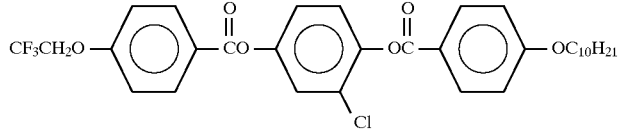
II-71
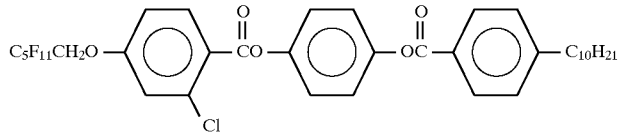
II-72
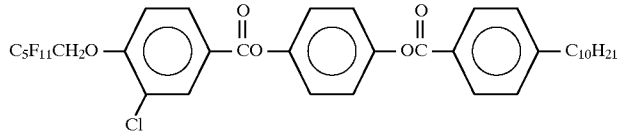
II-73
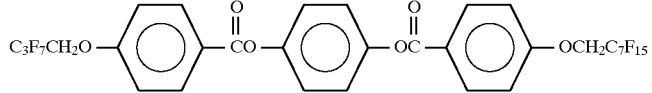
II-74
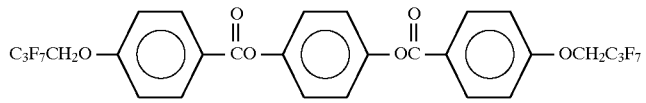
II-75
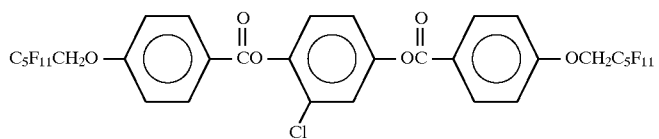
II-76

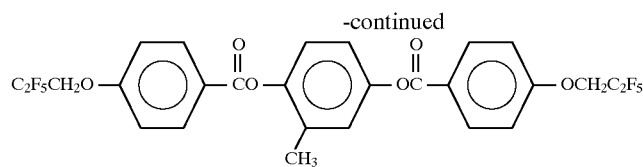 II-77
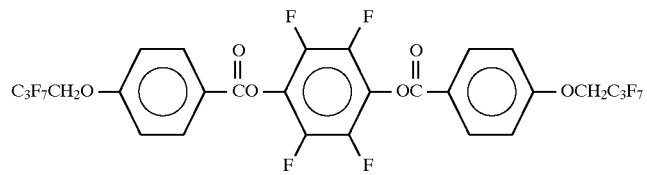 II-78
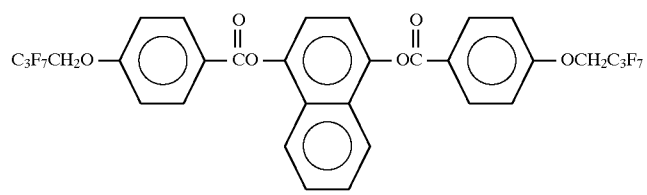 II-79
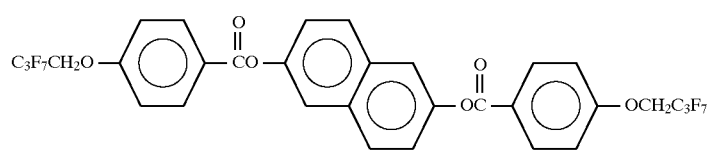 II-80
 II-81
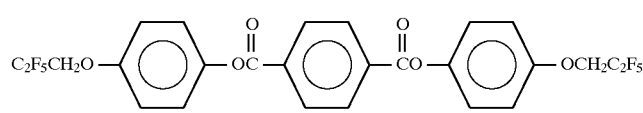 II-82
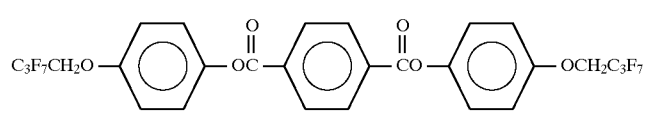 II-83
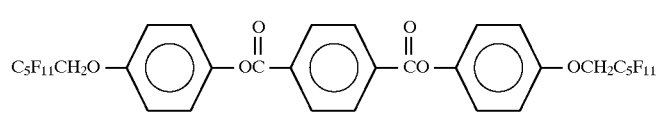 II-84
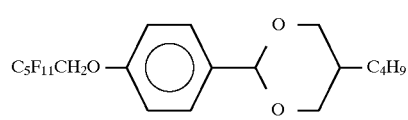 II-85
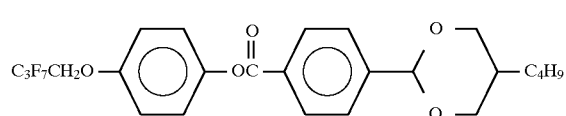 II-86
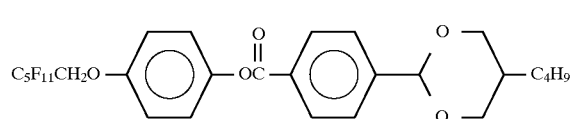 II-87
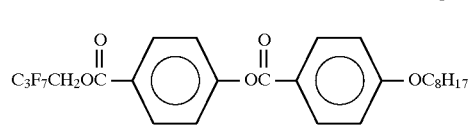 II-88

-continued
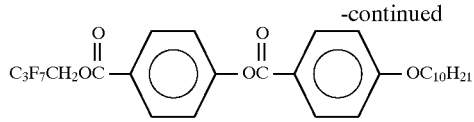 II-89
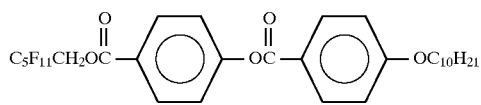 II-90
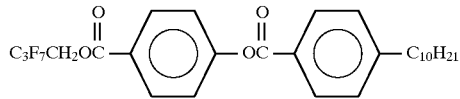 II-91
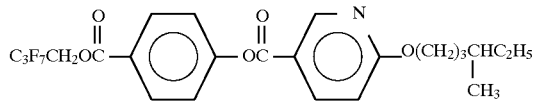 II-92
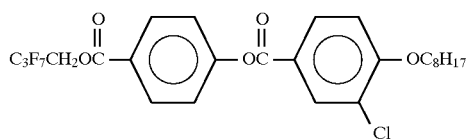 II-93
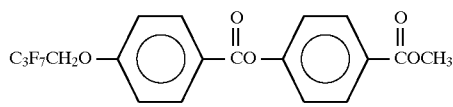 II-94
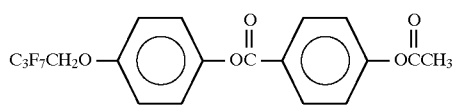 II-95
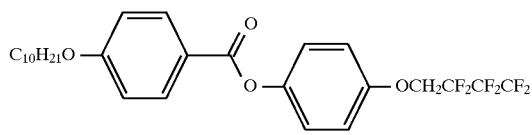 II-96
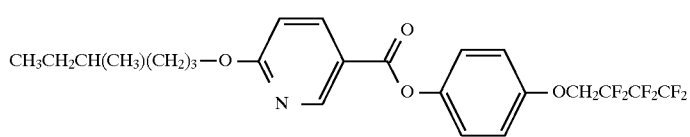 II-97
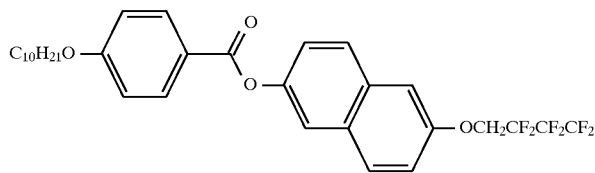 II-98
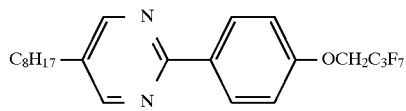 II-99
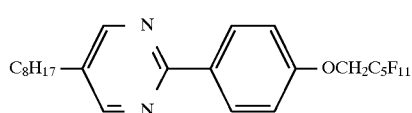 II-100
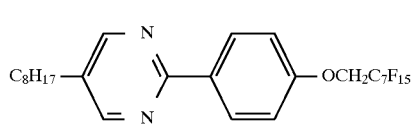 II-101

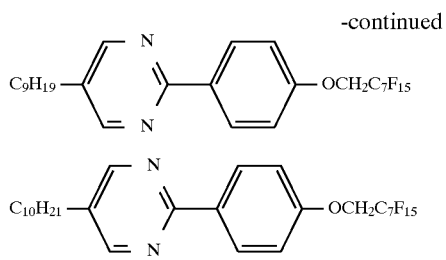
II-102
II-103
The compounds represented by the general formula (III) may be obtained though a process described in PCT Publication WO93/2396 (corr. to JP (Tokuhyo) 7-506368). Specific examples thereof are enumerated below.
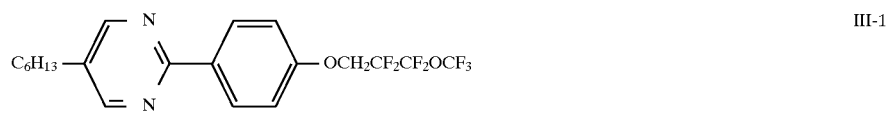
III-1
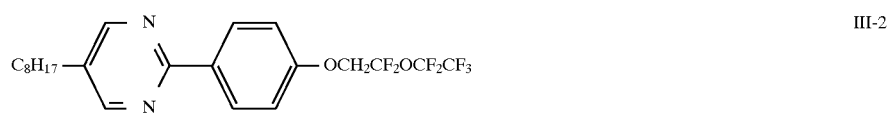
III-2
III-3
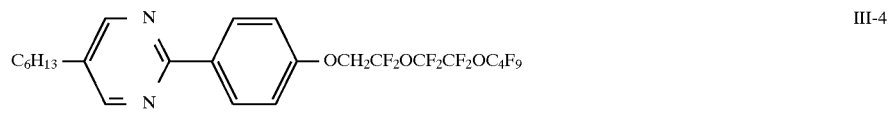
III-4
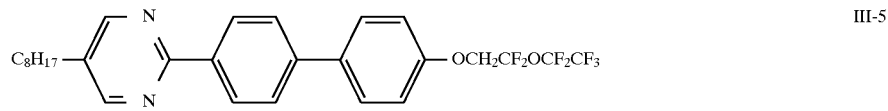
III-5
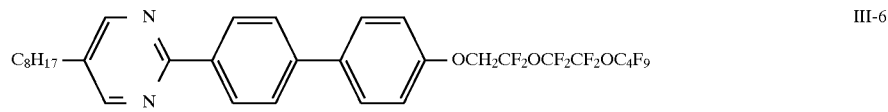
III-6
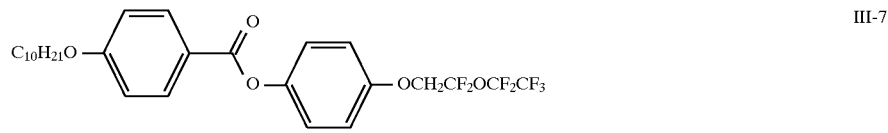
III-7
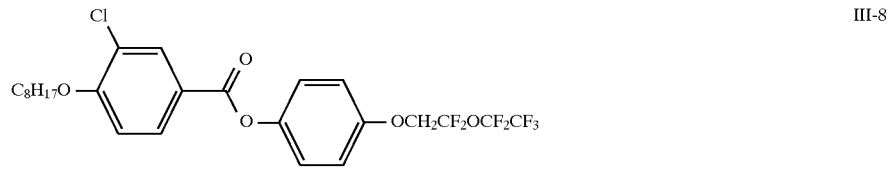
III-8
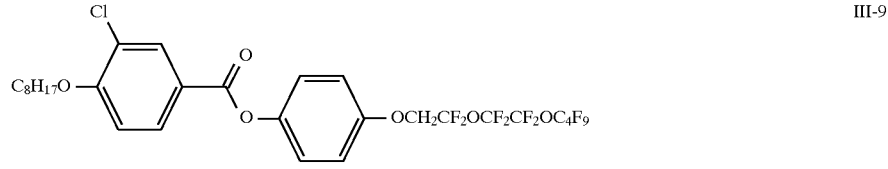
III-9

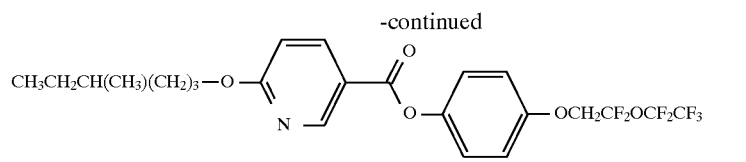
III-10
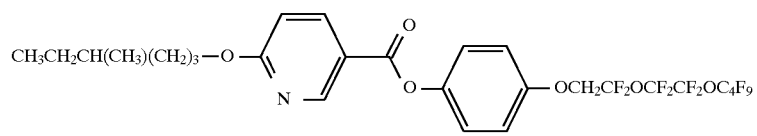
III-11
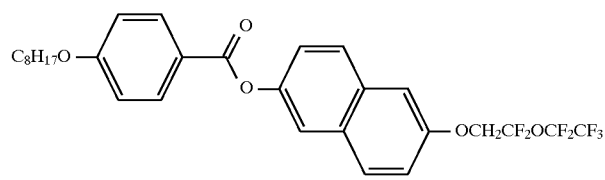
III-12
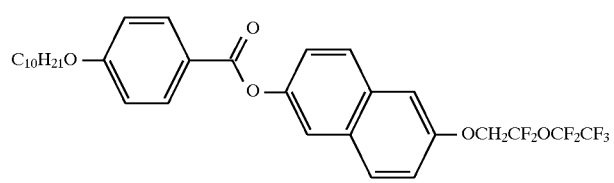
III-13
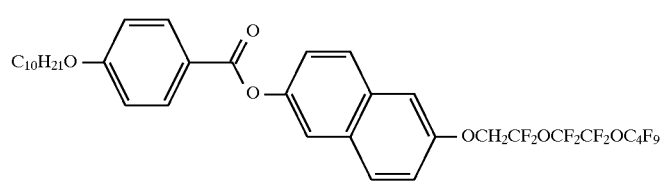
III-14
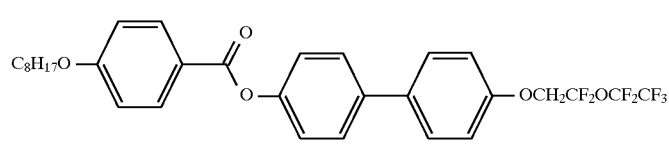
III-15
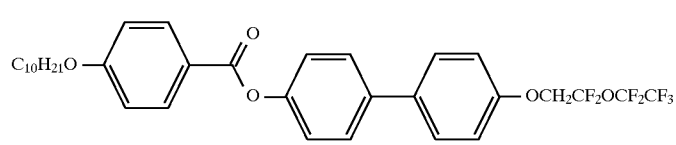
III-16
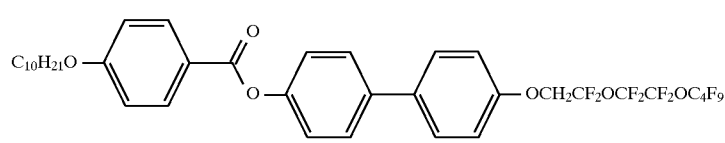
III-17
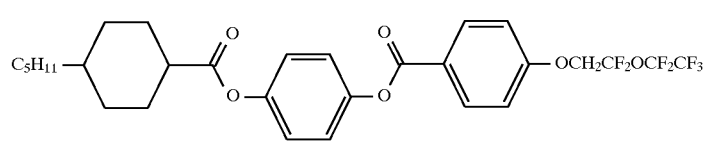
III-18
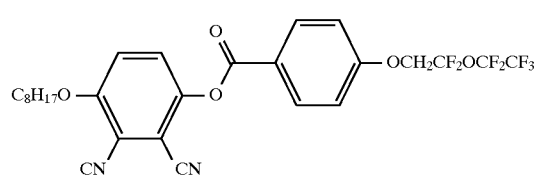
III-19

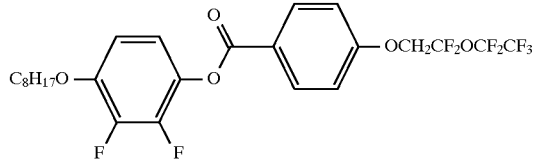  III-20
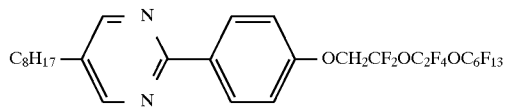  III-21
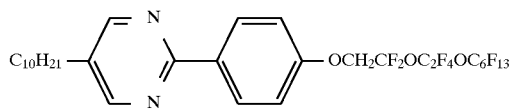  III-22
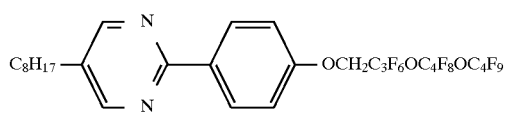  III-23
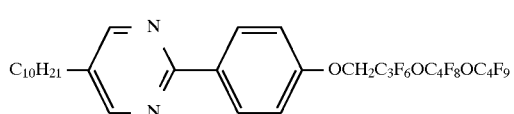  III-24
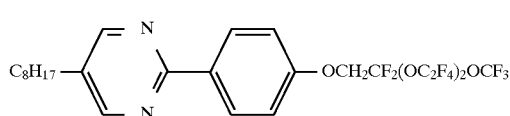  III-25
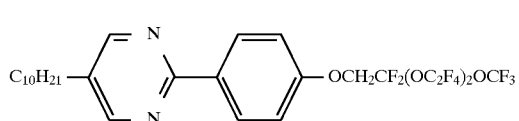  III-26
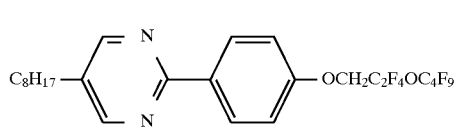  III-27
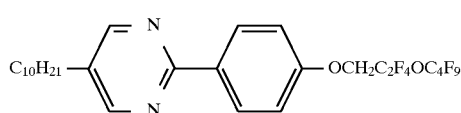  III-28
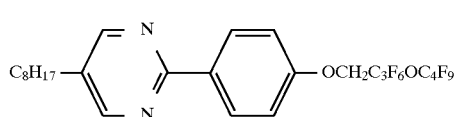  III-29
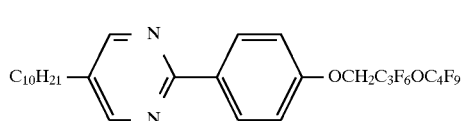  III-30
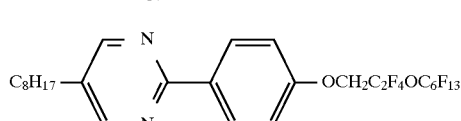  III-31
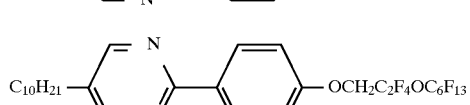  III-32

-continued
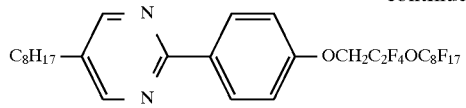
III-33
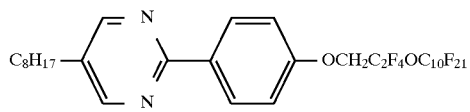
III-34
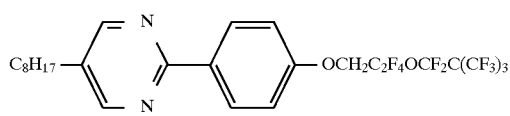
III-35
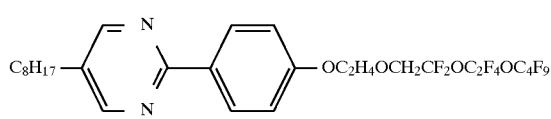
III-36
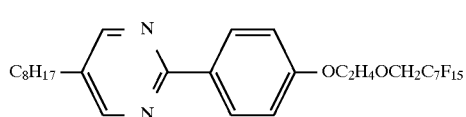
III-37
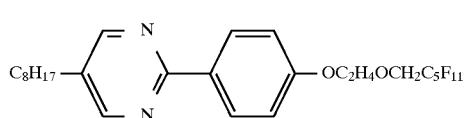
III-38
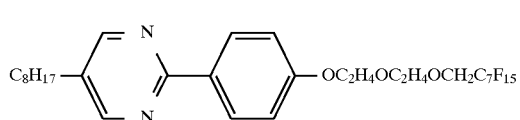
III-39
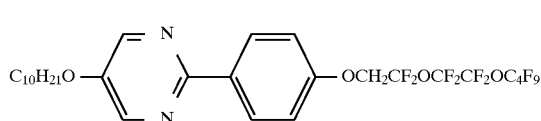
III-40
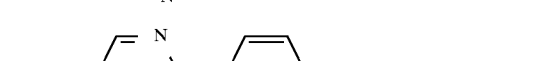
III-41
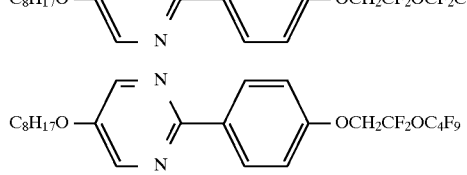
III-42
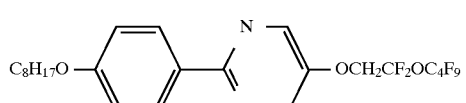
III-43
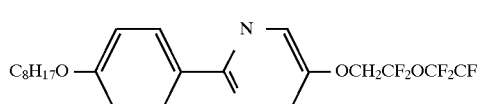
III-44
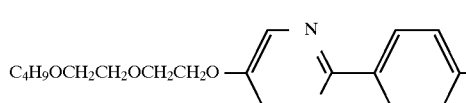
III-45
The chiral smectic liquid crystal composition used in the present invention may further contain a chiral compound, examples of which are enumerated below.

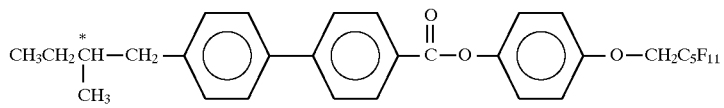 1
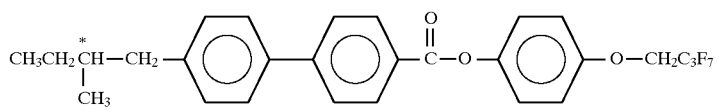 2
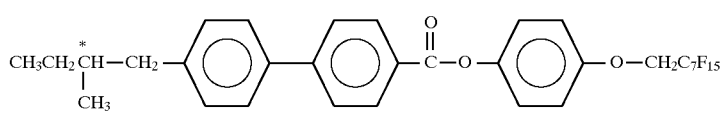 3
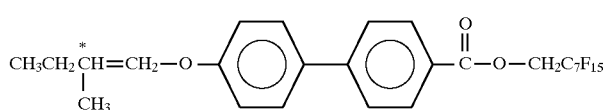 4
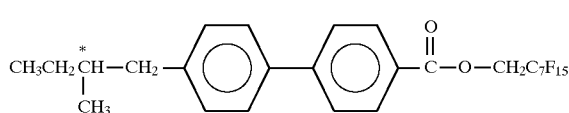 5
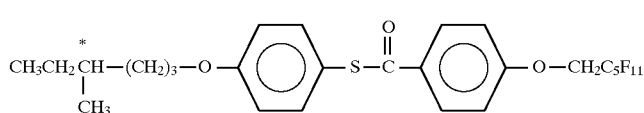 6
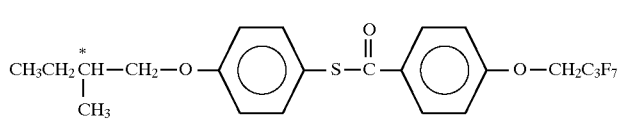 7
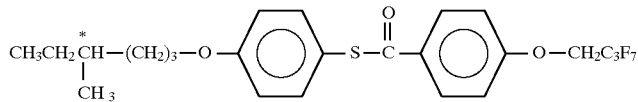 8
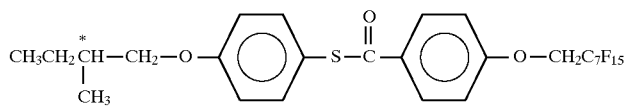 9
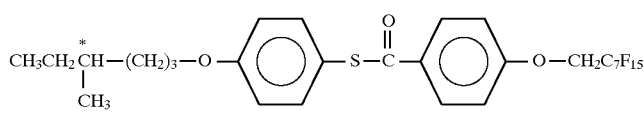 10
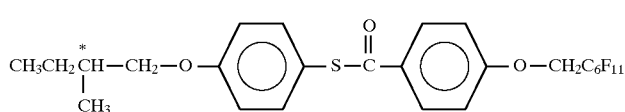 11
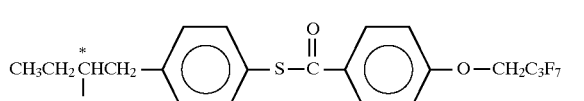 12
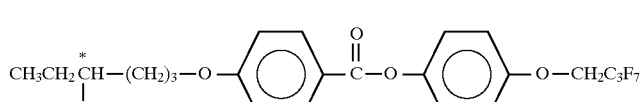 13
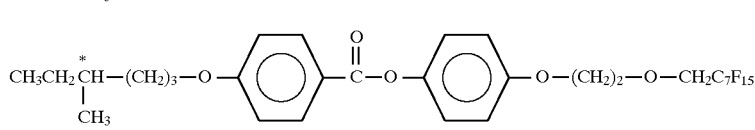 14

-continued
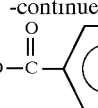  15
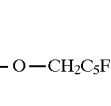  16
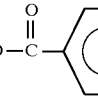  17
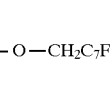  18
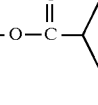  19
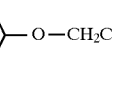  20
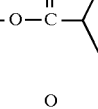  21
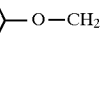  22
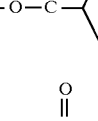  23
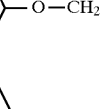  24
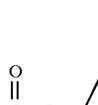  25
  26
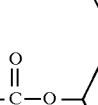  27
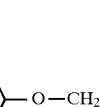  28

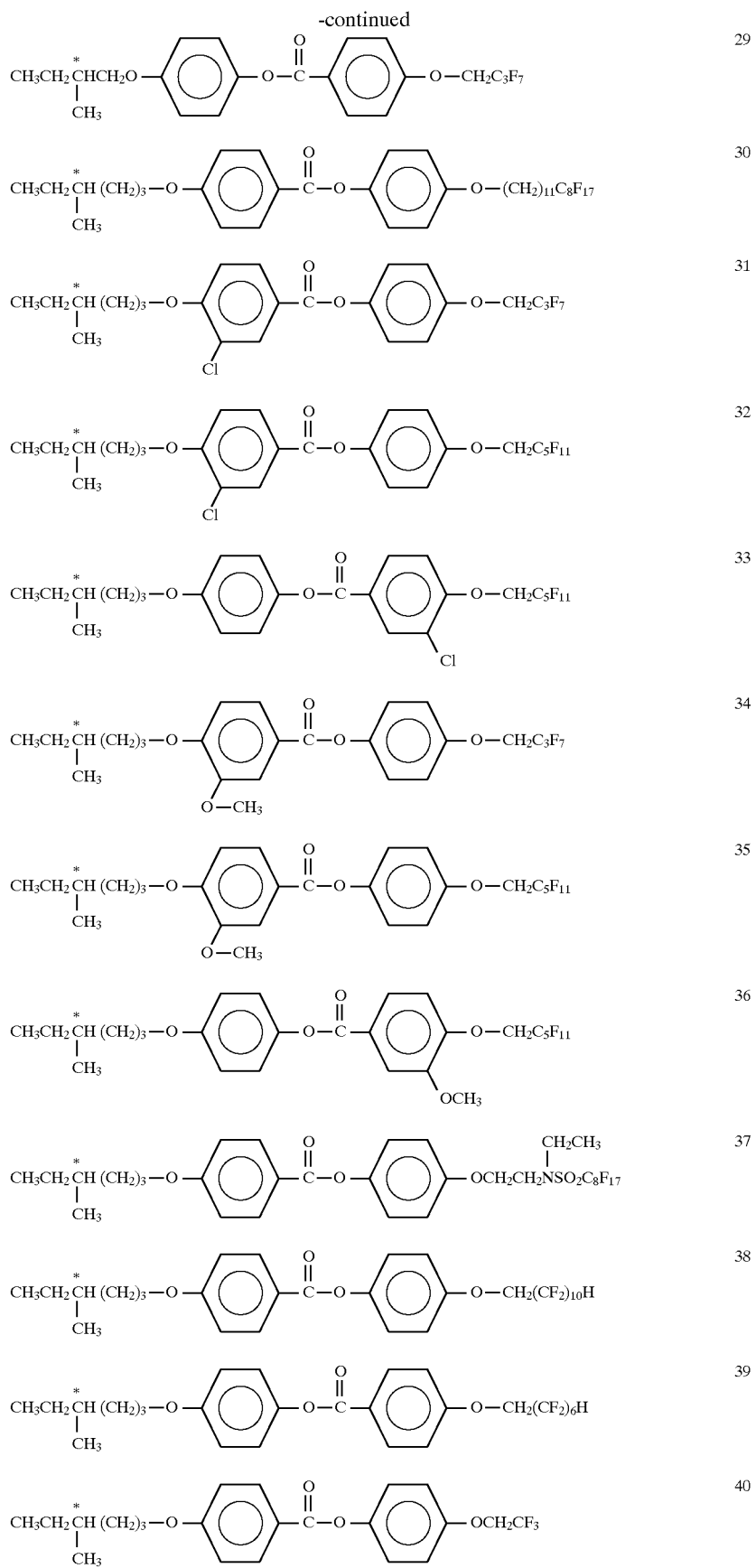

-continued
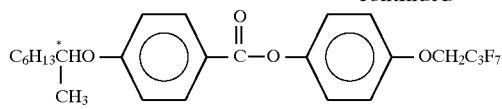
41
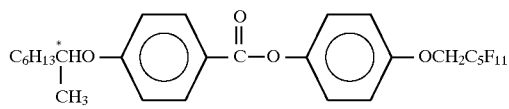
42
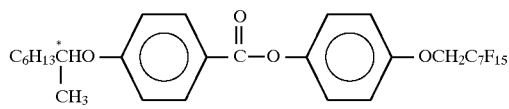
43
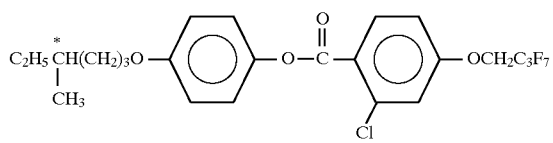
44
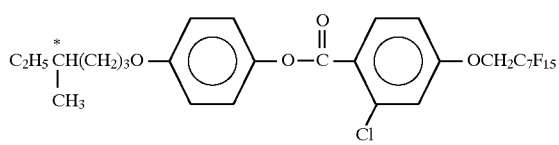
45
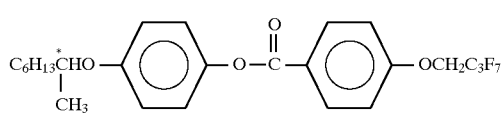
46
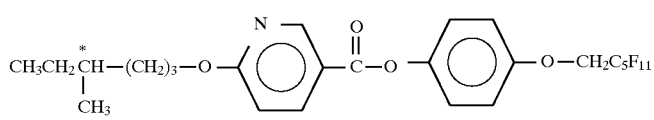
47
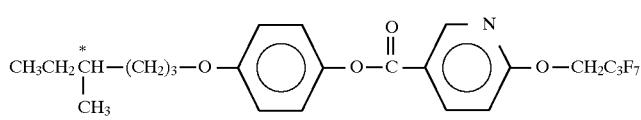
48
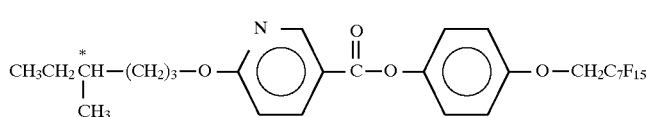
49
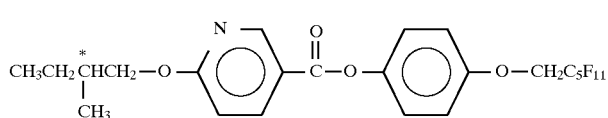
50
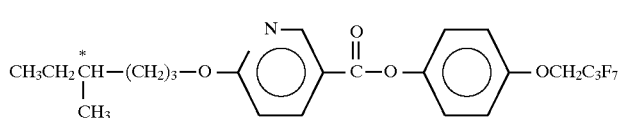
51
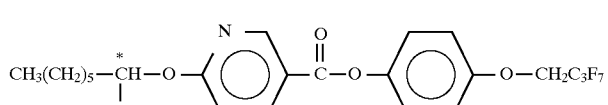
52
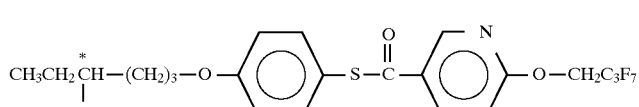
53

54 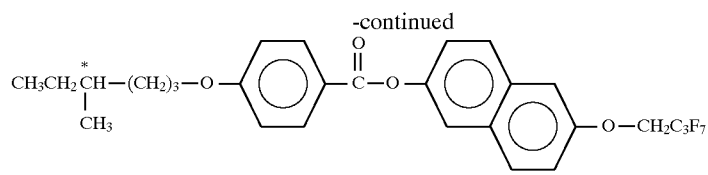
55 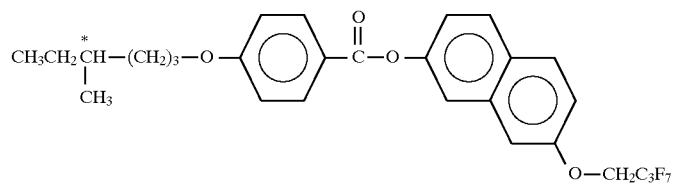
56 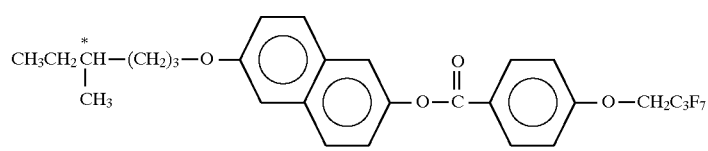
57 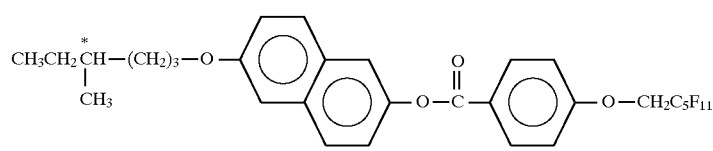
58 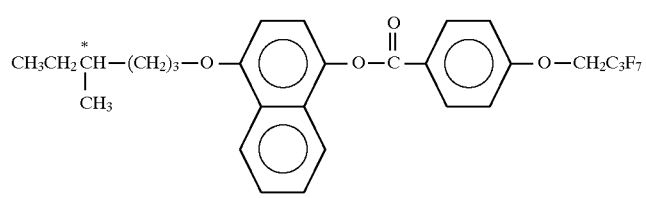
59 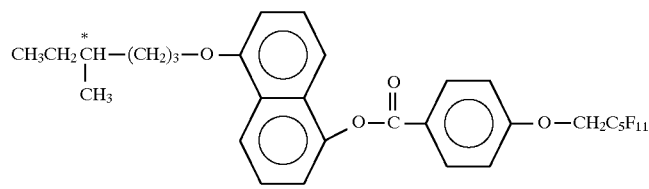
60 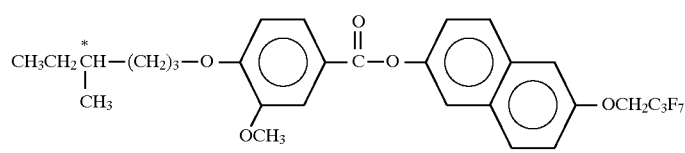
61 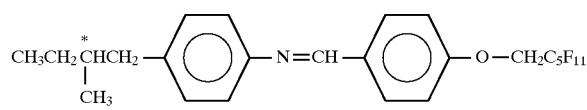
62 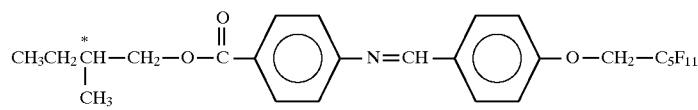
63 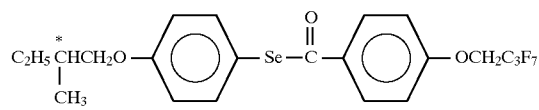
64 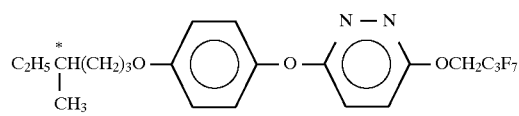

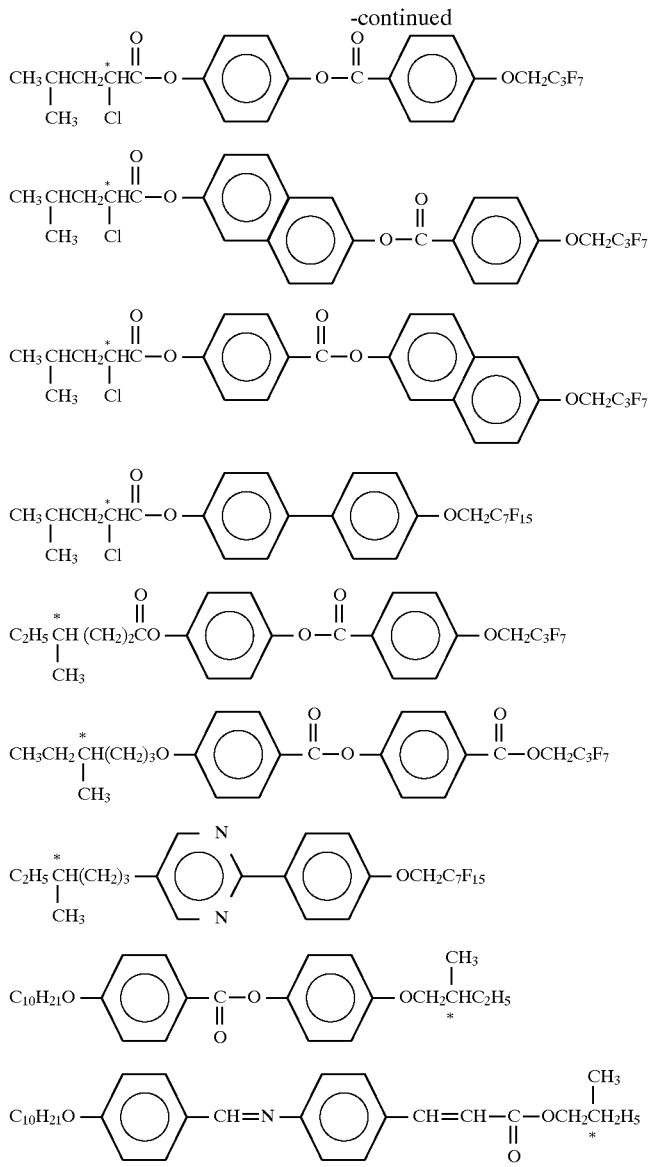

These chiral compounds may be used singly or in mixture of two or more species to provide an appropriate chirality to the chiral smectic liquid crystal composition used in the present invention.

More specifically, the liquid crystal composition used in the present invention may include a mesomorphic compound having a fluorine carbon terminal portion as an essential component and also contain a chiral compound as described in a proportion of 0.5–50 wt. %. In case where the chiral compound has no fluorine-containing terminal portion, the chiral compound may preferably be used in a proportion of 0.1–10 wt. % of the resultant liquid crystal composition in view of mutual solubility with the essential mesomorphic compound having a fluorocarbon compound having a fluorocarbon terminal portion.

The chiral smectic liquid crystal composition used in the present invention can further contain various other mesomorphic compounds appropriately selected from chiral compounds other than those described above and achiral compounds so as to control mutual solubility of the component compounds, and the resultant layer spacing, and further an optional additive, such as an antioxidant, an ultraviolet absorber, a dye or a pigment.

The liquid crystal device according to the present invention is characterized by the use of the above-mentioned chiral smectic liquid crystal composition to form a liquid crystal layer disposed between a pair of substrates at least one of which is provided with an alignment control layer comprising the above-mentioned polyimide, and other structures thereof are not particularly restricted.

The liquid crystal device according to the present invention can constitute various liquid crystal apparatus inclusive of display apparatus and optical shutter. For example, a liquid crystal apparatus 101 having a control system as illustrated by its block diagram shown in FIG. 4 may be constituted by using a liquid crystal device according to the present invention as a display panel 103. FIG. 5 is a time chart illustrating a manner of data communication for transferring image data including scanning line address data and certain data format as illustrated by using a communication synchronizing means based on a SYNC signal.

Figure 4:
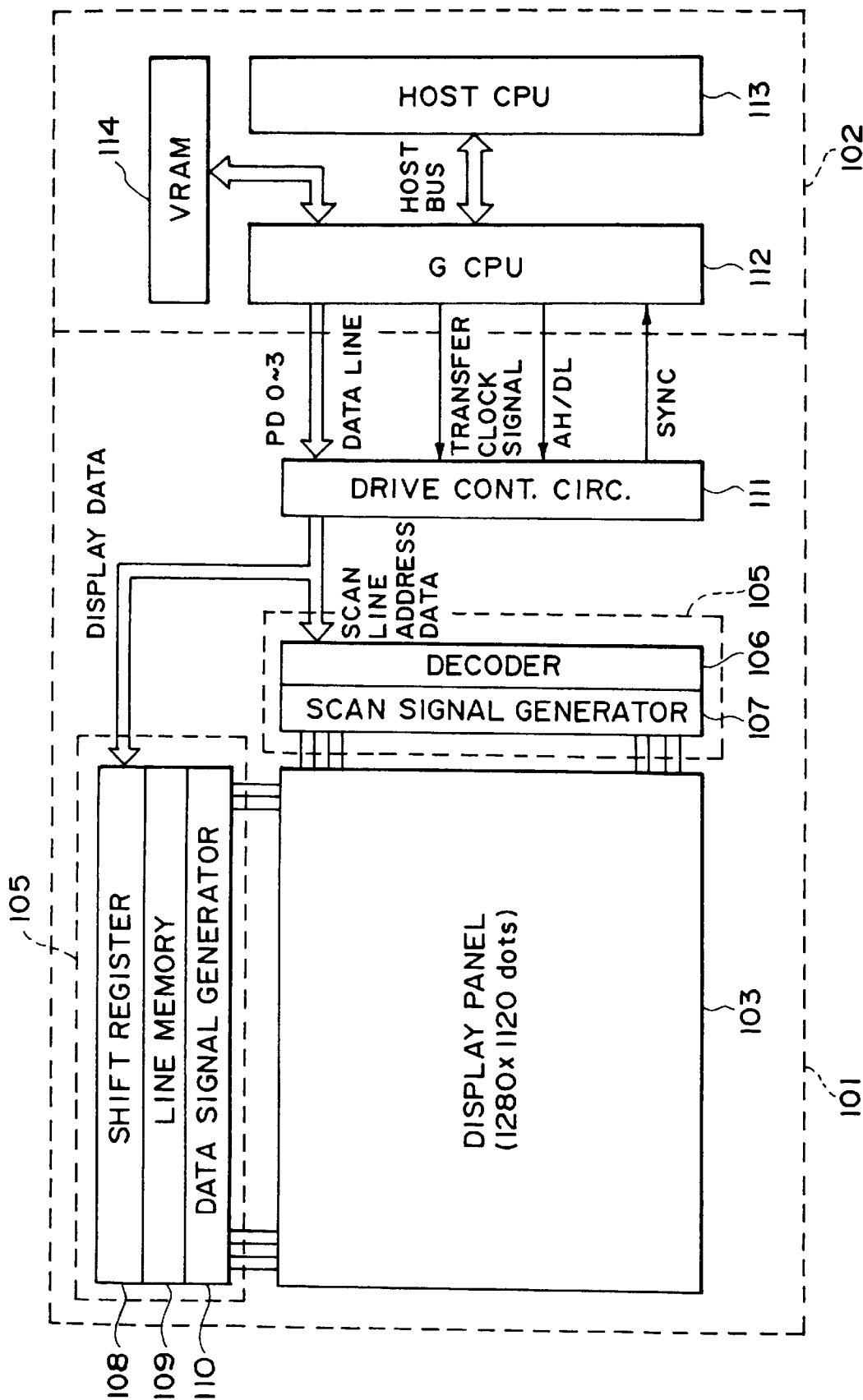
FIG. 4 is a block diagram of a liquid crystal apparatus (display apparatus) including a liquid crystal deice using a chiral smectic liquid crystal and a graphic controller.
Figure 5:
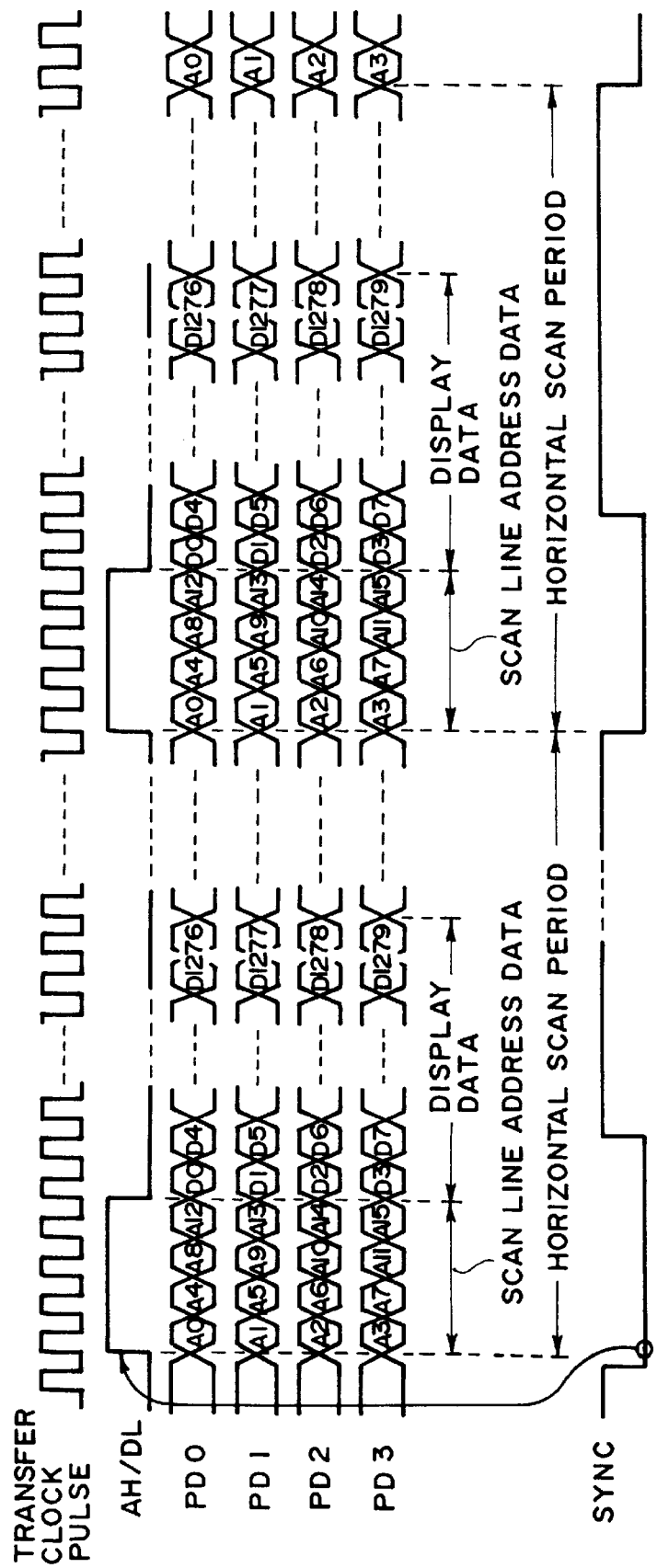
FIG. 5 is a time chart illustrating a manner of image data communication between the display data and the graphic controller.

More specifically, image data is generated from a graphic controller 102 in an apparatus main body and is transferred to the display panel signal transfer means as illustrated in FIGS. 4 and 5. The graphic controller 102 includes graphic central processing unit (GCPU) 112 and image data storage memory (VRAM) as core units and is in charge of control and communication of image data between a host CPU therein and the liquid crystal display apparatus 101. Incidentally, a light source (backlight) may be disposed, as desired, behind the display panel.

In case where the liquid crystal device according to the present invention is used to constitute a display device, the liquid crystal (composition) as a display medium assumes a chiral smectic layer structure of a bookshelf or one close thereto having a small layer inclination angle which is in a good alignment state, shows a good respectiveness and can provide a large area of good display image having high resolution, high brightness and excellent contrast.

Hereinbelow, the present invention will be described based on Examples. a liquid crystal composition comprising a 95/5 (ratio by weight) mixture of the following compounds A and B was used.

TABLE 1

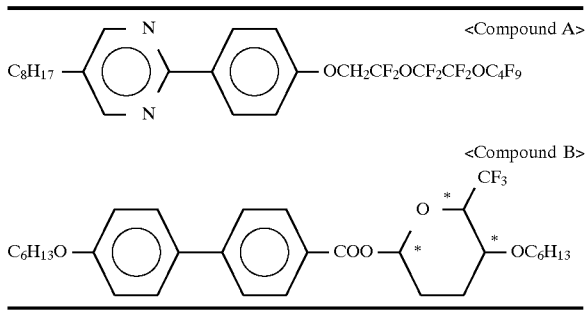

The liquid crystal composition showed the following physical properties.
Phase transition series

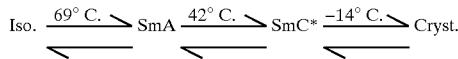

(Iso: isotropic phase, SmA: smectic A phase, SmC*: chiral smectic C phase, Cryst: crystal)

Tilt angle (30° C.): θ=25.8 deg.

Spontaneous polarization: Ps=−22.6 (nC/cm$^2$)

Layer inclination angle (30° C.): δ=0 deg.

$d_{min}/d_A$=3.179 (nm)/3.187 (nm)=0.997

The layer spacing d and the layer inclination angle δ were measured in the following manner.

The methods used were basically similar to the method used by Clark and Lagerwall (Japan Display '86, Sep. 30–Oct. 2, 1986, p.p. 456–458) or the method of Ohuchi et al (J.J.A.P., 27 (5) (1988), p.p. 725–728). The measurement was performed by using a diffraction apparatus (available from MAC Science having a rotary cathode-type X-ray generating unit), and 80 μm-thick glass sheets ("Microsheets",available from Corning Glass Works) were used as substrates so as to minimize the heat capacity and the X-ray absorption with the glass substrates.

More specifically, for measurement of the layer spacing d, a sample liquid crystal composition was applied in a 5 mm-square size so as to form a flat surface on the 80 μm-thick glass sheet and, while being temperature-controlled by a temperature-controlling plate and a temperature-monitoring thermocouple, irradiated with X rays from a rotary X-ray source, so that the output light including diffraction rays was detected by a detector (counter), similarly as in the ordinary powder X-ray diffraction. An angle providing a peak of X-ray intensity was substituted in the Bragg's formula for diffraction condition to obtain a layer spacing d.

Each sample liquid crystal composition was first brought to its isotropic phase temperature, and the measurement was repeated every 3° C. or every 1° C. in the vicinity of a transition point while cooling the sample down to a temperature where no diffraction peak was observed. The automatic temperature controller used allowed a control accuracy of ±0.3° C. at each measurement temperature.

The measurement was performed by using CuKα-rays (1.54050 Å) at a power of 45 kV-100 mA as analyzing rays and using a slit system including DS of 0.05 mm, SS of 0.05 mm and RS of 0.05 mm. The scanning was performed at a rate of 3 deg./min.

For the measurement of smectic layer inclination angle δ, a sample cell having a cell gap of 80 μm was prepared by using a pair of the 80 μm-thick glass sheets while using the same glass sheet as a spacer. A sample liquid crystal composition filling the sample cell was heated to isotropic phase and then gradually cooled to be homogeneously aligned under application of a magnetic field in a direction parallel to the substrates by an electromagnet. Then, the X-ray detector was set at the angle 2θ giving the above-mentioned layer spacing d, and the sample cell was subjected to θ-scanning. From the measured values, δ was calculated according to the method described in the above-mentioned references.

According to the above-described method, it is possible to obtain a layer inclination angle δ intrinsic to a sample liquid crystal composition while substantially removing the effect of a cell thickness thereon. However, it is also possible to obtain a substantially identical δ value in the temperature range of ca. 20° C. to 60° C. by using a 1.2 μm-thick cell having rubbed alignment films of polyimides (like those obtained from a commercially available polyimide precursor, such as "LP-64", "SP-710" or "SP-510" (available from Toray K.K.) instead of such an 80 μm-thick cell subjected to a magnetic field aligning treatment.

Figure 7:
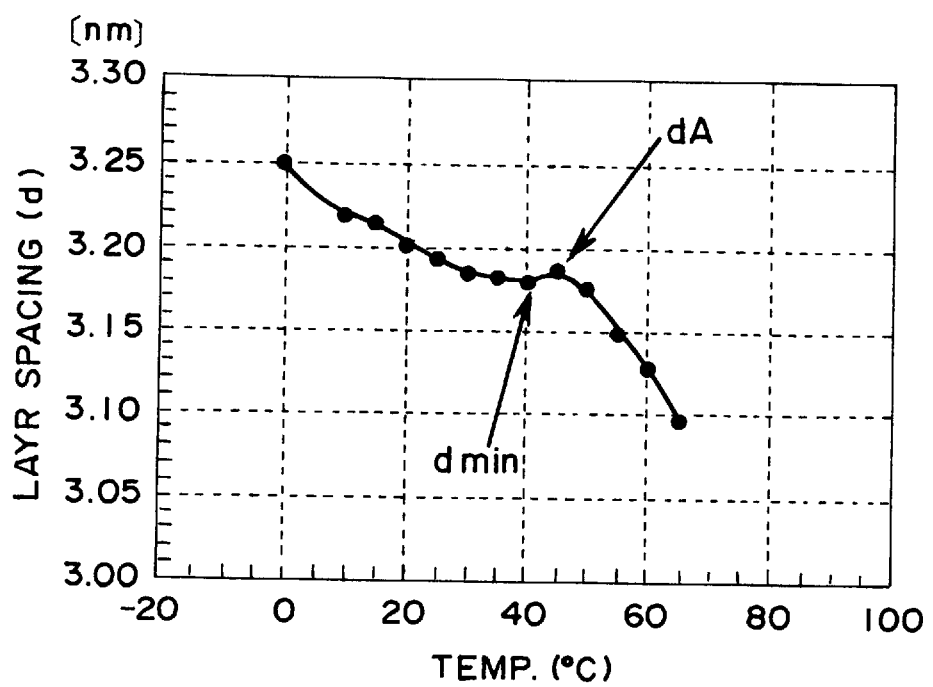
FIG. 7 is a graph showing a temperature dependence of layer spacing (d) of a chiral smectic liquid crystal composition used in Examples appearing hereinafter.

FIG. 7 is a graph showing a temperature-dependence of layer spacing of the above-mentioned A/B mixture composition. In FIG. 7, $d_A$ represents a layer spacing at a first transition point (ca. 42° C.) and $d_{min}$ represents a layer spacing at a second transition point (ca. 40° C.).

EXAMPLE 1

Two 1.1 mm-thick glass substrates each provided with a ca. 150 nm-thick ITO film were provided, and further coated with alignment control films by spin coating under different conditions.

More specifically, one substrate (first substrate) was coated with a solution in an N-methylpyrrolidone/n-butyl cellosolve (=2/1) mixture solvent containing 0.8 wt. % (as solid) of a polyamic acid as a precursor to a polyimide represented by a recurring unit of the following formula, followed by pre-drying at 80° C. for 5 min. and hot baking at 250° C. for 1 hour, to form a 5 nm-thick alignment film, which was then rubbed with a nylon cloth as a uniaxial aligning treatment.

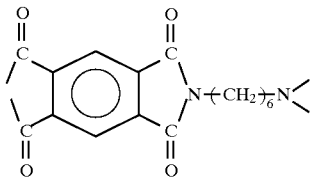

The other substrate was coated with 0.5 wt. %-solution in alcohol of a silane coupling agent ("ODS-E", mfd. by Chisso K.K.) by spin coating at 2000 rpm for 20 sec., followed by pre-drying at 80° C. for 5 min and hot-drying at 180° C. for 1 hour.

Then, spacer silica beads of 2.0 μm in average diameter were dispersed on the first substrate and the other substrate was superposed thereon to form a blank cell, which was then filled with the above-mentioned chiral smectic liquid crystal composition under vacuum, followed by cooling at a rate of 1° C./min. to room temperature to produce a liquid crystal device.

The thus-prepared liquid crystal device exhibited a high contrast of 110 as measured according to the following method (as a method for evaluating the alignment characteristic).

First, a sample liquid crystal device was sandwiched between a pair of polarizers disposed in right-angle cross nicols and supplied with driving waveforms as shown in FIG. 6A (enlarged in FIGS. 6AA and 6AB) (20 V/μm, ⅓ bias, duty factor of ¹/₁₀₀₀). Pulse widths were adjusted to cause bistable switching. At a first switched state, the liquid crystal device was rotated so as to find the darkest position where the transmitted light intensity Ib (as shown in FIG. 6B) was measured by a photomultiplier. Then, after switching into a second state, the light intensity Iw at the brightest state (as shown in FIG. 6B) was measured. From the results, a contrast ratio (CR) as an evaluation factor was obtained as a ratio Iw/Ib. The value CR is a measure of an alignment uniformity and is decreased also in the case of alignment defects causing light leakage therethrough to provide a larger Ib value.

EXAMPLE 2

A liquid crystal device was prepared by injecting the above-mentioned liquid crystal composition into a cell which was prepared in the same manner as in Example 1 except for forming an alignment control film of a polyimide having the following recurring unit by hot baking on the first substrate. The device showed a contrast of 92.

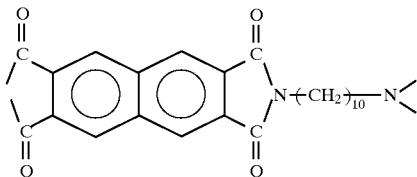

EXAMPLE 3

A liquid crystal device was prepared by injecting the above-mentioned liquid crystal composition into a cell which was prepared in the same manner as in Example 1 except for forming an alignment control film of a polyimide having the following recurring unit by hot baking on the first substrate. The device showed a contrast of 84.

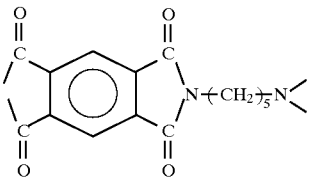

EXAMPLE 4

A liquid crystal device was prepared by injecting the above-mentioned liquid crystal composition into a cell which was prepared in the same manner as in Example 1 except for forming an alignment control film of a polyimide having the following recurring unit by hot baking on the first substrate. The device showed a contrast of 96.

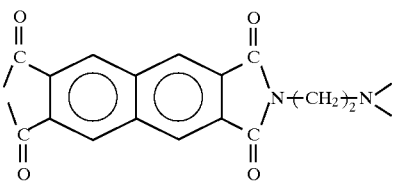

EXAMPLE 5

A liquid crystal device was prepared by injecting the above-mentioned liquid crystal composition into a cell which was prepared in the same manner as in Example 1 except for forming an alignment control film of a silicone-type oligomer ("Glass Resin GR650" (trade name), mfd. by Techneglas Inc.) applied in a 0.4 wt. %-solution in butanol on the second substrate. The device showed a contrast of 116.

Comparative Example 1

A liquid crystal device was prepared by injecting the above-mentioned liquid crystal composition into a cell which was prepared in the same manner as in Example 1 except for forming an alignment control film of a polyimide having the following recurring unit by hot baking on the first substrate. The device showed a contrast of 13.

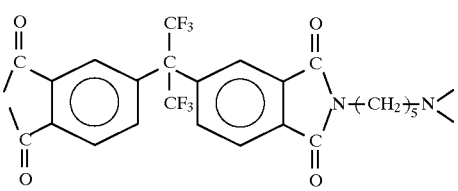

Comparative Example 2

A liquid crystal device was prepared by injecting the above-mentioned liquid crystal composition into a cell which was prepared in the same manner as in Example 1 except for forming an alignment control film of a polyimide having the following recurring unit by hot baking on the first substrate. The device showed a contrast of 32.

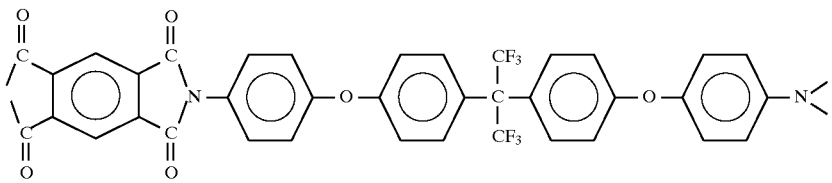

Comparative Example 3

A liquid crystal device was prepared by injecting the above-mentioned liquid crystal composition into a cell which was prepared in the same manner as in Example 1 except for forming the same rubbed polyimide alignment control film formed on the first substrate also on the second substrate and the substrates were superposed so that their rubbed directions were parallel and identical to each other. The device showed a contrast of 52.

Comparative Example 4

A liquid crystal device was prepared in the same manner as in Example 1 except for replacing the liquid crystal composition with a chiral smectic liquid crystal composition ("CS-1014" (trade name), mfd. by Chisso K.K.) showing physical properties shown below. The device showed a contrast of 12.

Phase transition series

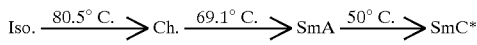

(Ch.: cholesteric phase)

$d_{min}/d^A = 0.946$

EXAMPLE 6

A liquid crystal device was prepared by injecting the above-mentioned liquid crystal composition into a cell which was prepared in the same manner as in Example 1 except for forming an alignment control film of a polyimide having the following recurring unit by hot baking on the first substrate. The device showed a contrast of 83.

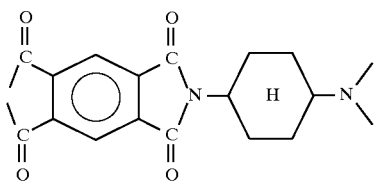

EXAMPLE 7

A liquid crystal device was prepared by injecting the above-mentioned liquid crystal composition into a cell which was prepared in the same manner as in Example 1 except for forming an alignment control film of a polyimide having the following recurring unit by hot baking on the first substrate. The device showed a contrast of 86.

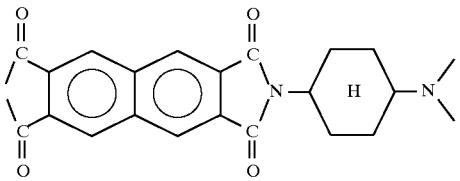

EXAMPLE 8

A liquid crystal device was prepared by injecting the above-mentioned liquid crystal composition into a cell which was prepared in the same manner as in Example 1 except for forming an alignment control film of a polyimide having the following recurring unit by hot baking on the first substrate. The device showed a contrast of 78.

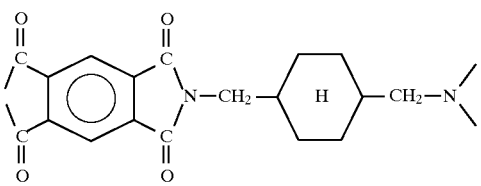

EXAMPLE 9

A liquid crystal device was prepared by injecting the above-mentioned liquid crystal composition into a cell which was prepared in the same manner as in Example 6 except for forming an alignment control film of a silicone-type oligomer ("Glass Resin GR650" (trade name), mfd. by Techneglas Inc.) applied in a 0.4 wt. %-solution in butanol on the second substrate. The device showed a contrast of 85.

Comparative Example 5

A liquid crystal device was prepared by injecting the above-mentioned liquid crystal composition into a cell which was prepared in the same manner as in Example 1 except for forming an alignment control film of a polyimide having the following recurring unit by hot baking on the first substrate. The device showed a contrast of 9.

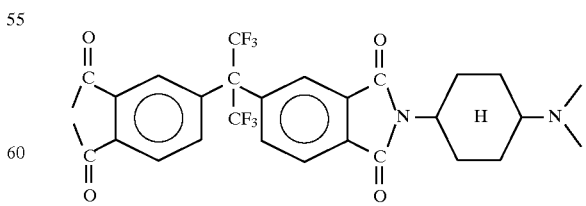

Comparative Example 6

A liquid crystal device was prepared by injecting the above-mentioned liquid crystal composition into a cell which was prepared in the same manner as in Example 6 except for forming the same rubbed polyimide alignment control film formed on the first substrate also on the second substrate. The device showed a contrast of 52.

Comparative Example 7

A liquid crystal device was prepared in the same manner as in Example 6 except for replacing the liquid crystal composition with a chiral smectic liquid crystal composition ("CS-1014" (trade name), mfd. by Chisso K.K.) showing physical properties shown below. The device showed a contrast of 8.

Phase transition series

Iso. $\xrightarrow{80.5° C.}$ Ch. $\xrightarrow{69.1° C.}$ SmA $\xrightarrow{50° C.}$ SmC*

(Ch.: cholesteric phase)

$d_{min}/d_A=0.946$

As is understood from the results of the above-described Examples and Comparative Examples, it has become possible to provide a liquid crystal device including a uniform and good alignment state of a chiral smectic liquid crystal composition satisfying a relationship of $d_{min}/d_A>0.990$ which may lack Ch phase and typically contain a compound comprising a fluorocarbon terminal portion and a hydrocarbon terminal portion connected with a central core and having smectic phase or latent smectic phase by using an alignment control film comprising a polyimide having a recurring unit represented by the general formula (I).

As described above, according to the present invention, there is provided a liquid crystal device allowing a liquid crystal layer of a bookshelf structure or a structure close thereto in a good alignment state, so that the device can exhibit excellent performances including a high contrast, a high-speed responsiveness and, for display, a high resolution and a high brightness.

According to the present invention, there is provided a liquid crystal display apparatus with a large area and excellent display performances by using the above-mentioned chiral smectic liquid crystal composition.

What is claimed is:

1. A liquid crystal device, comprising: a pair of transparent substrates each having thereon a transparent electrode, and a chiral smectic liquid crystal composition disposed between the substrates so as to assume at least two optically stable states, wherein at least one of the substrates is provided with an alignment film which comprises a polyimide represented by a recurring unit of formula (I) shown below and has been subjected to a uniaxial aligning treatment, and said chiral smectic liquid crystal composition comprises at least one species of fluorine-containing mesomorphic compound comprising a fluorocarbon terminal portion and a hydrocarbon terminal portion connected with a central core and having a smectic phase or a latent smectic phase;

Formula (I):

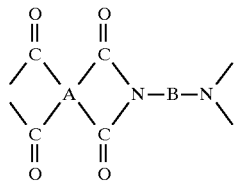

wherein A denotes a planar tetravalent organic residue group comprising an aromatic ring, an aromatic polycyclic ring, a heterocyclic ring or a condensed polycyclic ring, and B denotes a divalent aliphatic group comprising $-(CH_2)_n-$ (n: an integer of at least 1) or an alicyclic ring.

2. A liquid crystal device according to claim 1, wherein B in the formula (I) is a polymethylene group of $-(CH_2)_n-$ wherein n is an even number of 2–10.

3. A liquid crystal device according to claim 1, wherein said fluorocarbon terminal portion of the fluorine-containing mesomorphic compound is a group represented by the formula $-D^1-F_{xa}G_{2xa}-X$, where xa is 1–20; X is $-H$ or $-F$; $-D^1-$ is $-CO-O-(CH_2)_{ra}-$, $-O-(CH_2)_{ra}-$, $-(CH_2)_{ra}-$, $-O-SO_2-$, $-SO_2-$, $-SO_2-(CH_2)_{ra}$, $-O-(CH_2)_{ra}-O-CH_2)_{rb}-$, $-(CH_2)_{ra}-N(C_{pa}H_{2pa+1})$ $-SO_2-$ or $-(CH_2)_{ra}-N(C_{pa}H_{2pa+1})-CO-$; where ra and rb are independently 1–20; and pa is 0–4.

4. A liquid crystal device according to claim 1, wherein said fluorocarbon terminal portion of the fluorine-containing mesomorphic compound is a group represented by the formula $-D^2-(C_{xb}F_{2xb}-O)_{za}-C_{ya}F_{2ya+1}$, where xb is 1–10 independently for each $(C_{xb}F_{2xb}-O)$; ya is 1–10; za is 1–10; $-D^2-$ is $-CO-O-C_{rc}H_{2rc}-$, $-O-C_{rc}H_{2rc}-$, $-C_{rc}H_{2rc}-$, $-O-(C_{sa}H_{2sa}-O)_{ta}-C_{rd}H_{2rd}-$, $-O-SO_2-$, $-SO_2-$, $-SO_2-C_{rc}H_{2rc}-$, $-C_{rc}H_{2rc}-N(C_{pb}H_{2pb+1})-SO_2-$, $-C_{rc}H_{2rc}-N(C_{pb}H_{2pb+1})-CO-$, or a covalent bond, where rc and rd are independently 1–20; sa is independently 1–10 for each $(C_{sa}H_{2sa}-O)$; ta is 1–6; and pb is 0–4.

5. A liquid crystal device according to claim 1, wherein said fluorine-containing mesomorphic compound is represented by the general formula (II):

Formula (II):
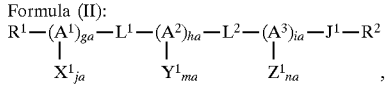

where $A^1$, $A^2$ and $A^3$ are each independently

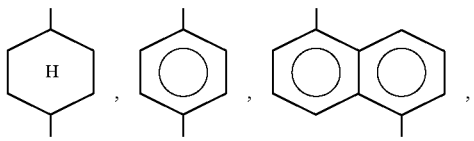

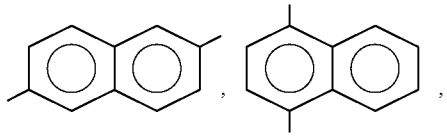

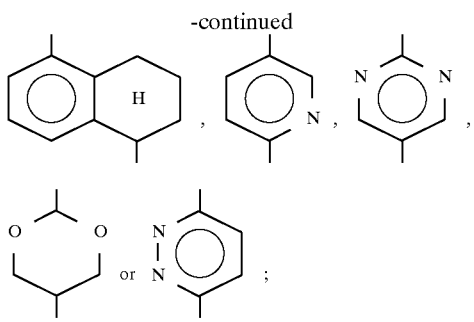

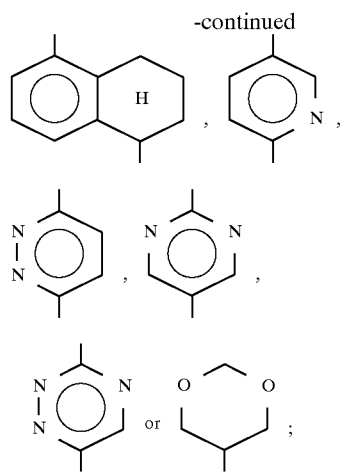

ga, ha and ia are independently an integer of 0–3 with the proviso that the sum of ga+ha+ia be at least 2;

$L^1$ and $L^2$ are each independently a covalent bond, —CO—O—, —O—CO—, —COS—, —S—CO—, —CO—Se—, —Se—CO—, —CO—Te—, —Te—CO—, —CH$_2$CH$_2$—, —CH=CH—, —C≡C—, —CH=N—, —N=CH—, —CH$_2$—O—, —O—CH$_2$—, —CO— or —O—;

$X^1$, $Y^1$ and $Z^1$ are each a substituent of $A^1$, $A^2$ and $A^3$, respectively, and each of $X^1$, $Y^1$ and $Z^1$ are independently —H, —Cl, —F, —Br, —I, —OH, —OCH$_3$, —CH$_3$, —CN or —NO$_2$;

each ja, ma and na are independently an integer of 0–4;

$J^1$ is —CO—O—(CH$_2$)$_{ra}$—, —O—(CH$_2$)$_{ra}$—, —(CH$_2$)$_{ra}$—, —O—SO$_2$—, —SO$_2$—, —SO$_2$—(CH$_2$)$_{ra}$—, —O—(CH$_2$)$_{ra}$—O—(CH$_2$)$_{rb}$—, —(CH$_2$)$_{ra}$—N(C$_{pa}$H$_{2pa+1}$)—SO$_2$— or —(CH$_2$)$_{ra}$—N(C$_{pa}$H$_{2pa+1}$)—CO—; where ra and rb are independently 1–20, and pa is 0–4;

$R^1$ is —O—C$_{qa}$H$_{2qa}$—O—C$_{qb}$H$_{2qb+1}$, —C$_{qa}$H$_{2qa}$—O—C$_{qb}$H$_{2qb+1}$, —C$_{qa}$H$_{2qa}$—R$^3$, —O—C$_{qa}$H$_{2qa}$—R$^3$, —CO—O—C$_{qa}$H$_{2qa}$—R$^3$, or —O—CO—C$_{qa}$H$_{2qa}$—R$^3$ which may be either straight chain or branched; where $R^3$ is —O—CO—C$_{qb}$H$_{2qb+1}$, —CO—O—C$_{qb}$H$_{2qb+1}$, —H, —Cl, —F, —CF$_3$, —NO$_2$ or —CN; and qa and gb are independently 1–20;

$R^2$ is C$_{xa}$F$_{2xa}$—X, where X is —H or —F, xa is an integer of 1–20.

6. A liquid crystal device according to claim 1, wherein said fluorine-containing mesomorphic compound is represented by the general formula (III):

Formula (III):
$$R^4-(A^4)_{gb}-L^3-(A^5)_{hb}-L^4-(A^6)_{ib}-J^2-R^5$$
$$\qquad\quad | \qquad\qquad | \qquad\qquad |$$
$$\qquad\quad X^2_{jb} \qquad\quad Y^2_{mb} \qquad\quad Z^2_{nb}$$

wherein $A^4$, $A^5$ and $A^6$ are each independently

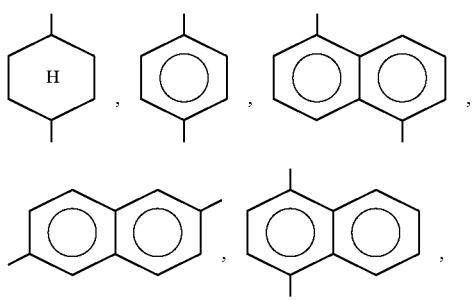

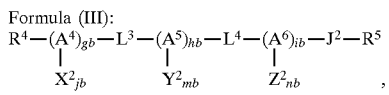

gb, hb and ib are each independently an integer of 0–3 with the proviso that the sum of gb+hb+ib be at least 2;

each $L^3$ and $L^4$ are independently a covalent bond, —CO—O—, —O—CO—, —CO—S—, —S—CO—, —CO—Se—, —Se—CO—, —CO—Te—, —Te—CO—, —(CH$_2$CH$_2$)$_{ka}$—(ka is 1–4), —CH=CH—, —C≡C—, —CH=N—, —N=CH—, —CH$_2$—O—, —O—CH$_2$—, —CO— or —O—;

$X^2$, $Y^2$ and $Z^2$ are each a substituent of $A^4$, $A^5$ and $A^6$, respectively, and each $X_2$, $Y_2$ and $Z_2$ are independently —H, —Cl, —F, —Br, —I, —OH, —OCH$_3$, —CH$_3$, —CF$_3$, —O—CF$_3$, —CN or —NO$_2$; each jb, mb and nb are independently an integer of 0–4;

$J^2$ is —CO—O—C$_{rc}$H$_{2rc}$—, —O—C$_{rc}$H$_{2rc}$—, —C$_{rc}$H$_{2rc}$—, —O—(C$_{sa}$H$_{2sa}$—O)$_{ta}$—C$_{rd}$H$_{2rd}$—, —O—SO$_2$—, —SO$_2$—, —SO$_2$—C$_{rc}$H$_{2rc}$—, —C$_{rc}$H$_{2rc}$—N(C$_{pb}$H$_{2qb+1}$)—SO$_2$— or —C$_{rc}$H$_{2rc}$—N(C$_{pb}$H$_{2pb+1}$)—CO—; rc and rd are independently 1–20; sa is independently 1–10 for each (C$_{sa}$H$_{2sa}$—O), ta is 1–6; and pb is 0–4;

$R^4$ is —O—(C$_{qc}$H$_{2qc}$—O)$_{wa}$—C$_{qb}$H$_{2qb+1}$, —(C$_{qc}$H$_{2qc}$—O)$_{wa}$—C$_{qd}$H$_{2qd+1}$, —C$_{qc}$H$_{2qc}$—R$^6$, —O—C$_{qc}$H$_{2qc}$—R$^6$, —CO—O—C$_{qc}$H$_{2qc}$—R$^6$, or O—CO—C$_{qc}$H$_{2qc}$—R$^6$ which may be either straight chain or branched; $R^6$ is —O—CO—C$_{qd}$H$_{2qd+1}$; —CO—O—C$_{qd}$H$_{2qd+1}$, —Cl, —F, —CF$_3$, —NO$_2$, —CN or —H; qc and qd are independently an integer of 1–20; wa is an integer of 1–10;

$R^5$ is (C$_{xb}$F$_{2xb}$—O)$_{za}$—C$_{ya}$F$_{2ya+1}$, wherein xb is independently 1–10 for each (C$_{xb}$F$_{2xb}$—O); ya is 1–10; and za is 1–10.

7. A liquid crystal device according to claim 1, wherein one of the substrates is provided with an alignment film which comprises the polyamide represented by a recurring unit of the formula (I) and has been subjected to a uniaxial aligning treatment, and the other substrate is provided with an alignment film which has not been subjected to a uniaxial aligning treatment.

8. A liquid crystal device according to claim 7, wherein B in the formula is a polymethylene group of —(CH$_2$)$_n$— wherein n is an even number of 2–10.

* * * * *

UNITED STATES PATENT AND TRADEMARK OFFICE
CERTIFICATE OF CORRECTION

PATENT NO. : 5,858,273

DATED : January 12, 1999

INVENTOR(S) : MASANOBU ASAOKA ET AL.                Page 1 of 5

It is certified that error appears in the above-identified patent and that said Letters Patent is hereby corrected as shown below:

```
     On the title page: Item

[56] REFERENCES CITED

Foreign Patent Documents
   "02142753" should read --02-142753--.

SHEET 7

Fig. 7, "LAYR" should read --LAYER--.

COLUMN 2

Line 22, "substrate" should read --substrates--.

COLUMN 4

Line 9, "deice" should read --device--.
   Line 50, "SmA-SmC" should read --SmA-SmC*--.
   Line 66, "us" should read --use--.

COLUMN 5

Line 27, "according to the present invention" should
      be deleted.
```

UNITED STATES PATENT AND TRADEMARK OFFICE
CERTIFICATE OF CORRECTION

PATENT NO.   : 5,858,273

DATED        : January 12, 1999

INVENTOR(S)  : MASANOBU ASAOKA ET AL.

It is certified that error appears in the above-identified patent and that said Letters Patent is hereby corrected as shown below:

COLUMN 6

Line 3, "P-17" should read --P-6 and P-9 to P-16--.
Polymers P-7 and P-8 should be deleted.

COLUMN 7

Line 1, "P-16" should read --P-9--.

COLUMN 8

Lines 1-8, " 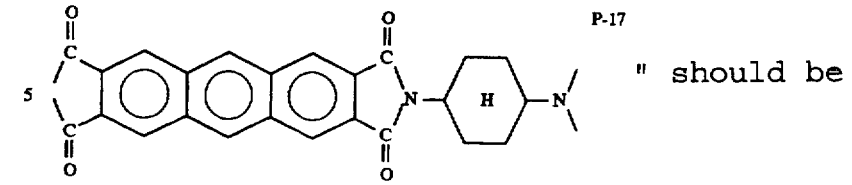 " should be deleted.

Lines 25, " " should be deleted.

COLUMN 9

Lines 25-28, "$-(A_3)_{ia}-$" should read --$-(A^3)_{ia}-$--.
$\quad\quad\quad\quad Z^1_{na}$  $\quad\quad\quad\quad\quad\quad Z^1_{na}$

UNITED STATES PATENT AND TRADEMARK OFFICE
CERTIFICATE OF CORRECTION

PATENT NO. : 5,858,273
DATED : January 12, 1999
INVENTOR(S) : MASANOBU ASAOKA ET AL.

It is certified that error appears in the above-identified patent and that said Letters Patent is hereby corrected as shown below:

COLUMN 10

Line 1, "are" should read --is--.
　　Line 3, "—$(CH_2)_{ra}$—" should read ---$(CH_2)_{ra}$—,--

COLUMN 23

II-81, "—$OCH_2CF_7$" should read ---$OCH_2CF_3$--.

COLUMN 25

II-96, "—$OCH_2CF_2CF_2CF_2$" should read ---$OCH_2CF_2CF_2CF_3$--.
　　II-97, "—$OCH_2CF_2CF_2CF_2$" should read ---$OCH_2CF_2CF_2CF_3$--.
　　II-98, "—$OCH_2CF_2CF_2CF_2$" should read ---$OCH_2CF_2CF_2CF_3$--.

COLUMN 27

Line 15, "though" should read --through--.

UNITED STATES PATENT AND TRADEMARK OFFICE
CERTIFICATE OF CORRECTION

PATENT NO. : 5,858,273

DATED : January 12,1999

INVENTOR(S) : MASANOBU ASAOKA ET AL.

It is certified that error appears in the above-identified patent and that said Letters Patent is hereby corrected as shown below:

COLUMN 35

Formula 4, "$CH_3CH_2CH=CH_2\text{—}O\text{—}$" should read

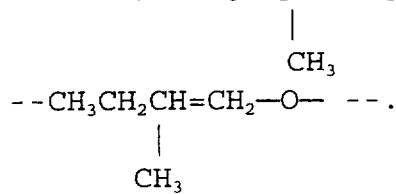

$$--CH_3CH_2CH=CH_2\text{—}O\text{—} \atop | \atop CH_3 --.$$

Formula 11, "$\text{—}O\text{—}CH_2C_6F_{11}$" should read $---O\text{—}CH_2C_5F_{11}--$.

COLUMN 51

Line 39, "$d_{min}/d^A=0.946$" should read $--d_{min}/d_A=0.946-$.

COLUMN 53

Line 29, "$d_{min}/d_A>0.990$" should read $--d_{min}/d_A\geq 0.990-$.

COLUMN 54

Line 27, "$\text{—}O\text{—}CH_2)_{rb}\text{—},$" should read $----O\text{—}(CH_2)_{rb}\text{—},--$.

UNITED STATES PATENT AND TRADEMARK OFFICE
CERTIFICATE OF CORRECTION

PATENT NO. : 5,858,273

DATED : January 12, 1999

INVENTOR(S) : MASANOBU ASAOKA ET AL.

It is certified that error appears in the above-identified patent and that said Letters Patent is hereby corrected as shown below:

COLUMN 56

Line 30, "$Y2$ and $Z2$" should read --$Y_2$ and $Z_2$--.
Line 38, "—$N(C_{ph}H_{2qb}+1)$—" should read ---$N(C_{ph}H_{2ph}+1)$.---.

Signed and Sealed this

Fourth Day of January, 2000

*Attest:*

*Attesting Officer*  *Acting Commissioner of Patents and Trademarks*